United States Patent
Liu et al.

(10) Patent No.: US 11,147,022 B2
(45) Date of Patent: Oct. 12, 2021

(54) TRANSMIT POWER CONTROL METHOD AND APPARATUS, DEVICE, AND STORAGE MEDIUM

(71) Applicant: Huawei Technologies Co., Ltd., Shenzhen (CN)

(72) Inventors: Zhe Liu, Beijing (CN); Xingwei Zhang, Beijing (CN); Chao Li, Beijing (CN); Jie Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/577,965

(22) Filed: Sep. 20, 2019

(65) Prior Publication Data

US 2020/0037255 A1 Jan. 30, 2020

Related U.S. Application Data

(63) Continuation of application No. PCT/CN2018/080032, filed on Mar. 22, 2018.

(30) Foreign Application Priority Data

Mar. 23, 2017 (CN) .......................... 201710179822.4

(51) Int. Cl.
*H04W 52/14* (2009.01)
*H04W 52/34* (2009.01)
*H04W 52/36* (2009.01)

(52) U.S. Cl.
CPC ......... *H04W 52/146* (2013.01); *H04W 52/34* (2013.01); *H04W 52/367* (2013.01)

(58) Field of Classification Search
CPC ............. H04W 52/346; H04W 52/146; H04W 52/367; H04W 52/34
See application file for complete search history.

(56) References Cited

U.S. PATENT DOCUMENTS

2011/0038271 A1 2/2011 Shin et al.
2013/0215811 A1 8/2013 Takaoka et al.
(Continued)

FOREIGN PATENT DOCUMENTS

CN 102651907 A 8/2012
CN 103220768 A 7/2013
(Continued)

OTHER PUBLICATIONS

WO2013067976A1 (English Translation) Gao et al., method and apparatus for controlling uplink transmission power, May 16, 2013. (Year: 2013).*

(Continued)

*Primary Examiner* — Keith Ferguson
(74) *Attorney, Agent, or Firm* — Slater Matsil, LLP

(57) ABSTRACT

When a transmission overlap between uplink carriers of at least two PUCCH groups exists in time domain, obtaining, by the terminal device, minimum reserved power of each PUCCH group based on transmission duration and/or transmission content; during transmission of uplink information, transmitting the uplink information after reducing power of an uplink carrier of each PUCCH group based on maximum transmit power and minimum reserved power of the uplink carrier of each PUCCH group, where transmit power of the uplink carrier after power reduction cannot be lower than the minimum reserved power; and if power on an overlapping part of an uplink carrier of a first PUCCH group is lower than minimum reserved power of the first PUCCH group, discarding information on the overlapping part of the uplink carrier of the first PUCCH group.

20 Claims, 10 Drawing Sheets

(56) References Cited

U.S. PATENT DOCUMENTS

| | | | |
|---|---|---|---|
| 2013/0230017 A1 | 9/2013 | Papasakellariou et al. | |
| 2016/0029366 A1 | 1/2016 | Papasakellariou et al. | |
| 2016/0205631 A1 | 7/2016 | Chen et al. | |
| 2016/0212711 A1 | 7/2016 | Yi | |
| 2016/0330693 A1 | 11/2016 | Hwang et al. | |
| 2017/0223695 A1* | 8/2017 | Kwak | H04W 56/0005 |
| 2019/0028975 A1* | 1/2019 | Nory | H04L 1/1861 |
| 2020/0037255 A1 | 1/2020 | Liu et al. | |
| 2020/0037257 A1* | 1/2020 | Yang | H04L 27/2607 |

FOREIGN PATENT DOCUMENTS

| | | |
|---|---|---|
| CN | 105101374 A | 11/2015 |
| CN | 105519215 A | 4/2016 |
| CN | 108632966 A | 10/2018 |
| CN | 110366862 A | 10/2019 |

OTHER PUBLICATIONS

LG Electronics, "Discussion on sTTI operation and combinations," 3GPP TSG RAN WG1 Meeting #88 R1-1702417, Athens, Greece, Feb. 2017, 3 pages.*

LG Electronics, "Multiplexing of UL channels and signals in NR," 3GPP TSG RAN WG1 NR-AdHoc Meeting, R1-1700506, Spokane, USA, Jan. 16-20, 2017, 6 pages.

3rd Generation Partnership Project; Technical Specification Group Radio Access Network; Evolved Universal Terrestrial Radio Access (E-UTRA);Physical layer procedures (Release 14), 3GPP TS 36.213 V14.1.0 (Dec. 2016), 745 pages.

Huawei et al., "PUSCH design for short TTI," 3GPP TSG RAN WG1 Meeting #86, R1-166153, Gothenburg, Sweden, Aug. 22-26, 2016, 3 pages.

Huawei et al., "UL power control for short TTI," 3GPP TSG RAN WG1 Meeting #87, R1-1611161, Reno, NV, USA, Nov. 14-18, 2016, 5 pages.

* cited by examiner

TRANSMIT POWER CONTROL METHOD AND APPARATUS, DEVICE, AND STORAGE MEDIUM

CROSS-REFERENCE TO RELATED APPLICATIONS

This application is a continuation of International Application PCT/CN2018/080032, filed on Mar. 22, 2018, which claims priority to Chinese Patent Application No. 201710179822.4, filed on Mar. 23, 2017. The disclosures of the aforementioned applications are hereby incorporated by reference in their entireties.

TECHNICAL FIELD

This application relates to communications technologies, and in particular, to a transmit power control method and apparatus, a device, and a storage medium.

BACKGROUND

A low latency technology in long term evolution (LTE) is being discussed, where an important aspect is that a short transmission time interval (sTTI) may be used in an uplink or a downlink. It is agreed in the 3GPP RAN1 #88 meeting that uplink/downlink sTTI duration combinations may be: {2, 2}, {2, 7}, and {7, 7}. In this manner, user equipment (UE) may transmit different services by using sTTIs of different duration, for example, transmit small-sized traffic or voice traffic by using an sTTI, and transmit big-sized data traffic such as video download by using a conventional TTI. In carrier aggregation, downlink TTI duration in a same physical uplink control channel (PUCCH) group is the same, but whether different sTTI duration combinations may be configured for different PUCCH groups is being researched.

To adapt to requirements of more types of services in the future, in a 5G technology, a network side and UE support a plurality of different types of subcarrier spacings, subframes of different duration, slots of different duration, and minimum slots of different duration, and further support two multiplexing modes: time division duplex (TDD) and frequency division duplex (FDD). In a low latency, because TTI duration is shortened, a location of a demodulation reference signal (DMRS) changes in comparison with that in LTE. The DMRS may be a self-contained DMRS, or may be a shared/multiplexed DMRS. In carrier aggregation, because different TTI duration may be configured, TTI duration of aggregated carriers may be different. In this case, when a PUCCH or a physical uplink shared channel (PUSCH) is transmitted in the uplink, there is a collision during transmission of different carriers in time domain, including a DMRS collision, a control channel collision, a data channel collision, or the like.

In a current technical solution, there is no solution to the DMRS collision, and there is no technical solution of processing power allocation in a PUCCH group in a case of a low latency.

SUMMARY

This application provides a transmit power control method and apparatus, a device, and a storage medium to resolve a problem of power allocation in a PUCCH group in a case of a DMRS collision or a low latency.

A first aspect of this application provides a transmit power control method, where the method is applied to a terminal device, and the method includes: when a transmission overlap between uplink carriers of at least two PUCCH groups exists in time domain, obtaining minimum reserved power of each PUCCH group based on transmission duration and/or transmission content, where downlink transmission duration is different between the PUCCH groups; and transmitting uplink information after reducing power of an uplink carrier of each PUCCH group based on maximum transmit power and minimum reserved power of the uplink carrier of each PUCCH group.

In a specific implementation, after power reduction, if reduced power on an overlapping part of an uplink carrier of a first PUCCH group is lower than minimum reserved power of the first PUCCH group, information on the overlapping part of the uplink carrier of the first PUCCH group is discarded.

It should be understood that, in an uplink information transmission process in this solution, after the terminal device reduces power on an overlapping part of the uplink carrier of each PUCCH group based on the specified maximum transmit power and the obtained minimum reserved power, the power on the overlapping part cannot be lower than corresponding minimum reserved power thereof. After reduction is performed based on a proportion, if the power on the overlapping part of the first PUCCH group is lower than the minimum reserved power, normal transmission and demodulation cannot be performed, and transmission may be abandoned.

In a specific implementation, the obtaining minimum reserved power of each PUCCH group based on transmission duration and/or transmission content includes: if uplink transmission duration of all the PUCCH groups is the same, determining the minimum reserved power of each PUCCH group based on downlink transmission duration of the group, where minimum reserved power of an uplink carrier of a PUCCH group whose downlink transmission duration is short is higher than minimum reserved power of a PUCCH group whose downlink transmission duration is long.

Optionally, if transmission content of uplink carriers of all the PUCCH groups is the same, minimum reserved power of a PUCCH group whose transmission duration is short is higher than minimum reserved power of a PUCCH group whose transmission duration is long.

Optionally, minimum reserved power of a PUCCH group whose uplink transmission duration is short is higher than minimum reserved power of a PUCCH group whose uplink transmission duration is long.

In another specific implementation, the obtaining minimum reserved power of each PUCCH group based on transmission duration and/or transmission content includes: when transmission content of the at least two PUCCH groups is different, determining the minimum reserved power of each PUCCH group based on priorities of the transmission content.

Optionally, if transmission content of uplink carriers of all the PUCCH groups is different, the terminal device may obtain the minimum reserved power of each PUCCH group based on priorities of the transmission content, where the transmission content includes a hybrid automatic repeat request-acknowledgement (HARQ-ACK) or a scheduling request (SR), channel state information (CSI), and data, and the priorities of the transmission content include: priorities of the HARQ-ACK and/or the SR, the CSI, and the data are in descending order.

The priorities of the transmission content are as follows: A priority of a carrier carrying the HARQ-ACK and/or the SR is the highest, a priority of a carrier carrying the CSI is the second highest, and a priority of a carrier carrying only the data is the lowest. To be specific, the priorities of the transmission content HARQ-ACK and/or SR, CSI, and data are in descending order. A power reduction factor is related to the minimum reserved power, the transmission duration, or the priority of the transmission content.

Optionally, if the transmission overlap between the uplink carriers of the at least two PUCCH groups exists in time domain, and the overlap occurs at a start symbol of long transmission or an end symbol of long transmission, a physical uplink control channel of a carrier of long transmission is transmitted in a short format. If one or more consecutive symbols at a start of long transmission overlap short transmission, after short transmission ends, a physical uplink control channel of long transmission is transmitted in a short format; or if the overlap occurs at one or more consecutive symbols before an end of long transmission, short transmission starts after a physical uplink control channel of long transmission is transmitted in a short format.

A second aspect of this application provides a transmit power control method, where the method is applied to a terminal device, and the method includes: when a transmission overlap between at least two channels exists in time domain, performing power control based on transmission duration or transmission content of the at least two channels, and transmitting uplink information, where a transmission priority of a channel whose transmission duration is short is higher than that of a channel whose transmission duration is long, or a priority of a channel carrying uplink control information is higher than that of a channel carrying other content, and the transmission content includes a demodulation reference signal (DMRS).

In a specific implementation, the at least two channels include a first channel and a second channel, and transmission duration of the first channel is shorter than transmission duration of the second channel.

In a specific implementation, a transmission overlapping part of the first channel and a transmission overlapping part of the second channel both use self-contained DMRSs for demodulation, a DMRS of the first channel and a DMRS of the second channel overlap, and transmission content on the transmission overlapping parts of the first channel and the second channel is the same; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, a transmission overlapping part of the first channel and a transmission overlapping part of the second channel both use self-contained DMRSs for demodulation, a DMRS of the first channel and a DMRS of the second channel overlap, the overlapping part of the first channel is a PUCCH, and the overlapping part of the second channel is a PUSCH or a PUCCH; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, a transmission overlapping part of the first channel and a transmission overlapping part of the second channel both use self-contained DMRSs for demodulation, a DMRS of the first channel and a DMRS of the second channel overlap, and the overlapping parts of the first channel and the second channel are both PUSCHs; and in this case, the performing, by the terminal device, power control based on transmission duration or transmission content of the at least two channels, and transmitting uplink information includes: if the first channel carries UCI, transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion; or if the second channel carries UCI, transmitting uplink information on the second channel, and transmitting uplink information after reducing, based on maximum transmit power, power on the overlapping part of the first channel that overlaps the second channel, where if the power on the overlapping part of the first channel after power reduction is insufficient to support DMRS demodulation, transmission of the DMRS and information to be demodulated by using the DMRS on the first channel is abandoned; or transmitting information after reducing transmit power of the first channel based on maximum transmit power and a first proportion, and transmitting information after reducing transmit power of the second channel based on a second proportion, where the first proportion is greater than the second proportion; or if the first channel and the second channel both carry UCI, transmitting uplink information based on priorities of content of the UCI, where the content of the UCI includes a hybrid automatic repeat request-acknowledgement HARQ-ACK, a scheduling request SR, channel state information CSI, and data, and the priorities of the content of the UCI include: priorities of the HARQ-ACK and/or the SR, the CSI, and the data are in descending order.

In a specific implementation, a transmission overlapping part of the first channel uses a shared DMRS for demodulation, a transmission overlapping part of the second channel uses a self-contained DMRS for demodulation, and the DMRS of the first channel does not overlap; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, a transmission overlapping part of the first channel uses a shared DMRS for demodulation, a transmission overlapping part of the second channel uses a self-contained DMRS for demodulation, the DMRS of the first channel does not overlap, the overlapping part of the first channel is a PUCCH, and the overlapping part of the second channel is a PUSCH or a PUCCH; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, a transmission overlapping part of the first channel uses a shared DMRS for demodulation, a transmission overlapping part of the second channel uses a self-contained DMRS for demodulation, the DMRS of the first channel does not overlap, and the first channel and the second channel are both PUSCHs; and in this case, the performing, by the terminal device, power control based on transmission duration or transmission content of the at least two channels, and transmitting uplink information includes: if the first channel carries UCI, transmitting uplink information on the first channel, and reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion; or if the second channel carries UCI, transmitting uplink information on the second channel, and transmitting uplink information after reducing, based on maximum transmit power, power on the overlapping part of the first channel that overlaps the second channel; or transmitting information after reducing transmit power of the first channel based on maximum transmit power and a first proportion, and transmitting information after reducing transmit power of the second channel based on a second proportion, where the first proportion is greater than the second proportion; or if the first channel and the second channel both carry UCI, transmitting uplink information based on priorities of content of the UCI, where the content of the UCI includes a hybrid automatic repeat request-acknowledgement HARQ-ACK, a scheduling request SR, channel state information CSI, and data, and the priorities of the content of the UCI include: priorities of the HARQ-ACK and/or the SR, the CSI, and the data are in descending order.

In a specific implementation, an overlapping part of the first channel uses a shared DMRS for demodulation, a transmission overlapping part of the second channel uses a self-contained DMRS for demodulation, the DMRS of the first channel overlaps, and transmission content on the transmission overlapping parts of the first channel and the second channel is the same; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, the DMRS and information to be demodulated by using the DMRS on the second channel are abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, an overlapping part of the first channel uses a shared DMRS for demodulation, a transmission overlapping part of the second channel uses a self-contained DMRS for demodulation, the DMRS of the first channel overlaps, the overlapping part of the first channel is a PUCCH, and the overlapping part of the second channel is a PUSCH or a PUCCH; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, an overlapping part of the first channel uses a shared DMRS for demodulation, a transmission overlapping part of the second channel uses a self-contained DMRS for demodulation, the DMRS of the first channel overlaps, and the overlapping parts of the first channel and the second channel are both PUSCHs; and in this case, the performing, by the terminal device, power control based on transmission duration or transmission content of the at least two channels, and transmitting uplink information includes: if the first channel carries UCI, transmitting uplink information on the first channel, and transmitting uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion; or if the second channel carries UCI, transmitting an uplink information on the second channel, and transmitting uplink information after reducing, based on maximum transmit power, power on the overlapping part of the first channel that overlaps the second channel, where if the power on the overlapping part of the first channel after power reduction is insufficient to support channel demodulation by using the DMRS, transmission of information to be demodulated by using the DMRS on the first channel is abandoned; or transmitting information after reducing transmit power of the first channel based on maximum transmit power and a first proportion, and transmitting information after reducing transmit power of the second channel based on a second proportion, where the first proportion is greater than the second proportion; or if the first channel and the second channel both carry UCI, transmitting uplink information based on priorities of content of the UCI, where the content of the UCI includes a hybrid automatic repeat request-acknowledgement HARQ-ACK, a scheduling request SR, channel state information CSI, and data, and the priorities of the content of the UCI include: priorities of the HARQ-ACK and/or the SR, the CSI, and the data are in descending order.

In a specific implementation, an overlapping part of the first channel uses a self-contained DMRS for demodulation, the second channel uses a shared DMRS for demodulation, and the DMRS of the second channel does not overlap; and in this case, the performing, by the terminal device, power control based on transmission duration or transmission content of the at least two channels, and transmitting uplink information includes: if the DMRS of the second channel is transmitted successfully, transmitting, by the terminal device, uplink information on the second channel, and transmitting uplink information after reducing, based on maximum transmit power, power on the overlapping part of the first channel that overlaps the second channel, where if the power on the overlapping part of the first channel after power reduction is insufficient to support channel demodulation by using the DMRS, transmission of the DMRS and information to be demodulated by using the DMRS on the first channel is abandoned; or transmitting information after reducing transmit power of the first channel based on maximum transmit power and a first proportion, and transmitting information after reducing transmit power of the second channel based on a second proportion, where the first proportion is greater than the second proportion.

In a specific implementation, an overlapping part of the first channel uses a self-contained DMRS for demodulation, an overlapping part of the second channel uses a shared DMRS for demodulation, the DMRS of the second channel does not overlap, and transmission content on the transmission overlapping parts of the first channel and the second channel is the same; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel; or transmitting information after reducing transmit power of the first channel based on maximum transmit power and a first proportion, and transmitting information after reducing transmit power of the second channel based on a second proportion, where the first proportion is smaller than the second proportion.

In a specific implementation, an overlapping part of the first channel uses a self-contained DMRS for demodulation, an overlapping part of the second channel uses a shared DMRS for demodulation, the DMRS of the second channel does not overlap, the overlapping part of the first channel is a PUCCH, and the overlapping part of the second channel is a PUSCH or a PUCCH; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel; or transmitting information after reducing transmit power of the first channel based on maximum transmit power and a first proportion, and transmitting information after reducing transmit power of the second channel based on a second proportion, where the first proportion is smaller than the second proportion.

In a specific implementation, an overlapping part of the first channel uses a self-contained DMRS for demodulation, an overlapping part of the second channel uses a shared DMRS for demodulation, the DMRS of the second channel does not overlap, and the overlapping parts of the first channel and the second channel are both PUSCHs; and in this case, the performing, by the terminal device, power control based on transmission duration or transmission content of the at least two channels, and transmitting uplink information includes: if the first channel carries UCI, transmitting uplink information on the first channel, and transmitting uplink information after reducing, based on maximum transmit power, power on the overlapping part of the second channel that overlaps the first channel; or transmitting information after reducing transmit power of the first channel based on maximum transmit power and a first proportion, and transmitting information after reducing transmit power of the second channel based on a second proportion, where the first proportion is smaller than the second proportion; or if the second channel carries UCI, transmitting uplink information on the second channel, and transmitting uplink information after reducing, based on maximum transmit power, power on the overlapping part of the first channel that overlaps the second channel, where if the power on the overlapping part of the first channel after power reduction is insufficient to support channel demodulation by using the DMRS, transmission of the DMRS and information to be demodulated by using the DMRS on the first channel is abandoned; or transmitting information after reducing transmit power of the first channel based on maximum transmit power and a first proportion, and transmitting information after reducing transmit power of the second channel based on a second proportion, where the first proportion is greater than the second proportion; or if the first channel and the second channel both carry UCI, transmitting uplink information based on priorities of content of the UCI, where the content of the UCI includes a hybrid automatic repeat request-acknowledgement HARQ-ACK, a scheduling request SR, channel state information CSI, and data, and the priorities of the content of the UCI include: priorities of the HARQ-ACK and/or the SR, the CSI, and the data are in descending order.

In a specific implementation, a transmission overlapping part of the first channel and a transmission overlapping part of the second channel both use shared DMRSs for demodulation, and a DMRS of the first channel does not collide with a DMRS of the second channel; and in this case, the performing, by the terminal device, power control based on transmission duration or transmission content of the at least two channels, and transmitting uplink information includes: transmitting uplink information on the first channel, and transmitting uplink information after reducing, based on maximum transmit power, power on the overlapping part of the second channel that overlaps the first channel; or transmitting information after reducing transmit power of the first channel based on maximum transmit power and a first proportion, and transmitting information after reducing transmit power of the second channel based on a second proportion, where the first proportion is smaller than the second proportion; or if the first channel carries UCI, transmitting uplink information on the first channel, and transmitting uplink information after reducing, based on maximum transmit power, power on the overlapping part of the second channel that overlaps the first channel; or if the second channel carries UCI, transmitting uplink information on the second channel, and transmitting uplink information after reducing, based on maximum transmit power, power on the overlapping part of the first channel that overlaps the second channel; or if the first channel and the second channel both carry UCI, transmitting uplink information based on priorities of content of the UCI, where the content of the UCI includes a hybrid automatic repeat request-acknowledgement HARQ-ACK, a scheduling request SR, channel state information CSI, and data, and the priorities of the content of the UCI include: priorities of the HARQ-ACK and/or the SR, the CSI, and the data are in descending order.

In a specific implementation, a transmission overlapping part of the first channel and a transmission overlapping part of the second channel both use shared DMRSs for demodulation, and a DMRS of the first channel collides with a DMRS of the second channel; and in this case, the performing, by the terminal device, power control based on transmission duration or transmission content of the at least two channels, and transmitting uplink information includes: transmitting uplink information on the first channel, and transmitting information after reducing power on the DMRS of the second channel based on maximum transmit power, where if the power on the overlapping part of the second channel after power reduction is insufficient to support channel demodulation by using the DMRS, transmission of information to be demodulated by using the DMRS on the second channel is abandoned; or transmitting information after reducing transmit power of the first channel based on maximum transmit power and a first proportion, and transmitting information after reducing transmit power of the second channel based on a second proportion, where the first proportion is smaller than the second proportion.

In a specific implementation, the second channel includes a channel for slot aggregation transmission or uplink control information UCI retransmission; and in this case, the performing, by the terminal device, power control based on transmission duration or transmission content of the at least two channels, and transmitting uplink information includes: transmitting uplink information on the first channel, and reducing, based on maximum transmit power, power on an overlapping part of the second channel that overlaps the first channel, where after power reduction, if the power on the overlapping part of the second channel that overlaps the first channel is lower than preset minimum reserved power, information on the overlapping part of the second channel that overlaps the first channel is discarded.

A meaning of this solution is as follows: When a slot aggregation transmission carrier or a UCI repetition carrier overlaps a first carrier, the terminal device transmits uplink information on the first carrier, and reduces, based on the maximum transmit power, power on an overlapping part of the slot aggregation transmission carrier or the UCI repetition carrier that overlaps the first carrier; and after power reduction, if the power on the overlapping part of the slot aggregation transmission carrier or the UCI repetition carrier that overlaps the first carrier is lower than the preset minimum reserved power, information on the overlapping part of the slot aggregation transmission carrier or the UCI repetition carrier that overlaps the first carrier is discarded. In this solution, a priority of short transmission is higher than that of slot aggregation transmission or the UCI retransmission.

A third aspect of this application provides a transmit power control apparatus, where the apparatus may be a terminal device or may be a chip in a terminal device. The apparatus may include a processing unit and a transceiver unit. When the apparatus is a terminal device, the processing unit may be a processor, and the transceiver unit may be a transceiver; the terminal device may further include a storage unit, where the storage unit may be a memory; the storage unit is configured to store an instruction; and the processing unit executes the instruction stored in the storage unit, so that the terminal device performs the transmit power control method provided by any manner of the first aspect or the second aspect. When the apparatus is a chip in a terminal device, the processing unit may be a processor, and the transceiver unit may be an input/output interface, a pin, a circuit, or the like; the processing unit executes an instruction stored in a storage unit, so that the terminal device performs the first aspect or the second aspect and optional implementations of the first aspect or the second aspect; and the storage unit may be a storage unit (for example, a register or a cache) in the chip, or may be a storage unit (for example, a read-only memory, or a random access memory) located outside the chip in the terminal device.

A fourth aspect of this application provides a transmit power control apparatus, where the apparatus includes a memory and a processor, the memory stores an instruction, and when the processor executes the instruction, the apparatus performs the transmit power control method provided by any manner of the first aspect or the second aspect. The apparatus may be a chip system.

A fifth aspect of this application provides a terminal device, including a memory, a processor, and a computer program, where the computer program is stored in the memory, and the processor executes the computer program to perform the transmit power control method provided by any manner of the first aspect or the second aspect.

A sixth aspect of this application provides a storage medium, including a readable storage medium and a computer program, where the computer program is used to implement the transmit power control method provided by any manner of the first aspect or the second aspect.

In a specific implementation of the foregoing terminal device, a quantity of processors is at least one, and the processor is configured to execute an executable instruction stored in the memory, that is, the computer program, so that the terminal device performs data interaction with a receive end (for example, a base station or another network device) by using a communications interface, to perform the transmit power control method provided by the first aspect or the second aspect or any optional implementation of the first aspect or the second aspect. Optionally, the memory may be integrated in the processor.

A seventh aspect of this application provides a program product, where the program product includes a computer program (that is, an executable instruction), and the computer program is stored in a readable storage medium. At least one processor of a terminal device may read the computer program from the readable storage medium, and the at least one processor executes the computer program, so that the terminal device implements the transmit power control method provided by each implementation of the first aspect or the second aspect.

According to the transmit power control method and apparatus, the device, and the storage medium provided by embodiments of this application, when a transmission overlap between uplink carriers of at least two PUCCH groups exists in time domain, the terminal device obtains minimum reserved power of each PUCCH group based on transmission duration and/or transmission content; and when transmitting uplink information, the terminal device transmits the uplink information after reducing power of an uplink carrier of each PUCCH group based on maximum transmit power and minimum reserved power of the uplink carrier of each PUCCH group. Therefore, a problem of transmit power allocation in a PUCCH group in a case of a low latency is resolved. In addition, when a transmission overlap between at least two channels exists in time domain, the terminal device performs power control based on transmission duration or transmission content of the at least two channels, and transmits uplink information, where whether a DMRS overlaps in the transmission content is considered, a transmission priority of a channel whose transmission duration is short is higher than that of a channel whose transmission duration is long, or a priority of a channel carrying uplink control information is higher than that of a channel carrying other content, and a power control solution in a case of a DMRS collision is provided.

DETAILED DESCRIPTION OF ILLUSTRATIVE EMBODIMENTS

Figure 1A:
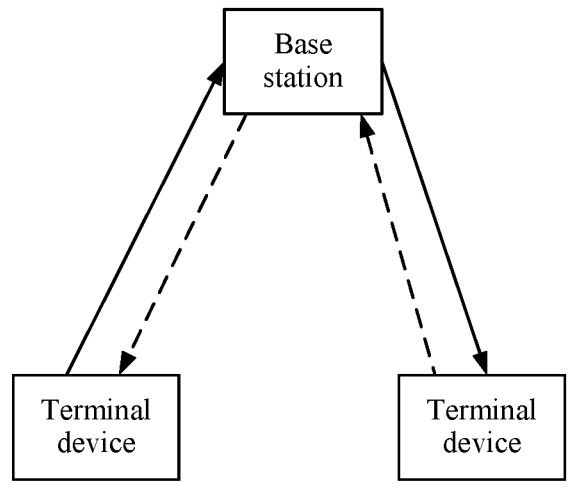
FIG. 1a is a schematic diagram of a system to which a transmit power control method is applied according to this application.

The technical solutions of the embodiments of this application may be applied to a 5G communications system or a future communications system, or may be applied to various other wireless communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, or a universal mobile telecommunications system (UMTS).

A dual connectivity technology is added to a standard protocol Release-12. A difference between the dual connectivity (DC) technology and a previous carrier aggregation (CA) technology lies in that, there are two independent base stations: a master eNB (MeNB) and a secondary eNB (SeNB), which independently control a master cell group (MCG) and a secondary cell group (SCG). The DC technology allows system time asynchronization between a macro cell and a small cell. In the DC, the MCG and the SCG respectively have maximum transmit power PMeNB and PSeNB. Total power of carriers in the MCG cannot exceed the PMeNB. Likewise, total power of carriers in the SCG cannot exceed the PSeNB, and a sum of the PMeNB and the PSeNB cannot exceed maximum transmit power P of all carriers. In the DC, uplink control information (UCI) may be transmitted on a physical uplink control channel (PUCCH) in the MCG and a PUCCH in the SCG. Because the DC allows system time asynchronization between the MCG and the SCG, a transmission overlapping exists in a transmission process of subframes of different cells scheduled by the MeNB and the SeNB. In this case, the transmission overlapping needs to be considered in uplink power control. In the dual connectivity (DC), there is also a concept of a PUCCH group. In this case, because the MCG and the SCG may be asynchronous, a transmission overlapping exists in a transmission process of subframes of different cells scheduled by the MeNB and the SeNB. A general processing manner is that total power on overlapping parts cannot exceed the maximum transmit power. Therefore, power of transmission channels on the overlapping parts needs to be increased or reduced proportionally based on priorities. However, a power priority in a case of a DMRS collision is not considered, and power allocation in a PUCCH group in a case of a low latency is not considered either.

In a transmit power control method provided by this application, priorities of transmission content (a demodulation reference signal (DMRS), UCI, and data), transmission time interval (TTI) duration (SCS), and the like, and a priority of aggregation transmission are considered. In addition, a method for power control in a PUCCH group is also provided. With reference to specific implementations, the following describes in detail the transmit power control method provided by this application.

Figure 1B:
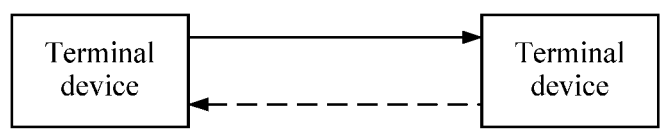
FIG. 1b is a schematic diagram of another system to which a transmit power control method is applied according to this application.

FIG. 1a is a schematic diagram of a system to which a transmit power control method is applied according to this application. FIG. 1b is a schematic diagram of another system to which a transmit power control method is applied according to this application. As shown in FIG. 1a and FIG. 1b, a main technical solution of this application may be used in a cellular link between a base station and a terminal device, or may be used in a sidelink in which transmission is performed without directly using a base station, that is, a transmission link between devices. The transmit power control method provided by this application is used to perform power control when an overlap (also referred to as a collision) occurs in an uplink transmission process of the terminal device.

Embodiment 1

Figure 2:
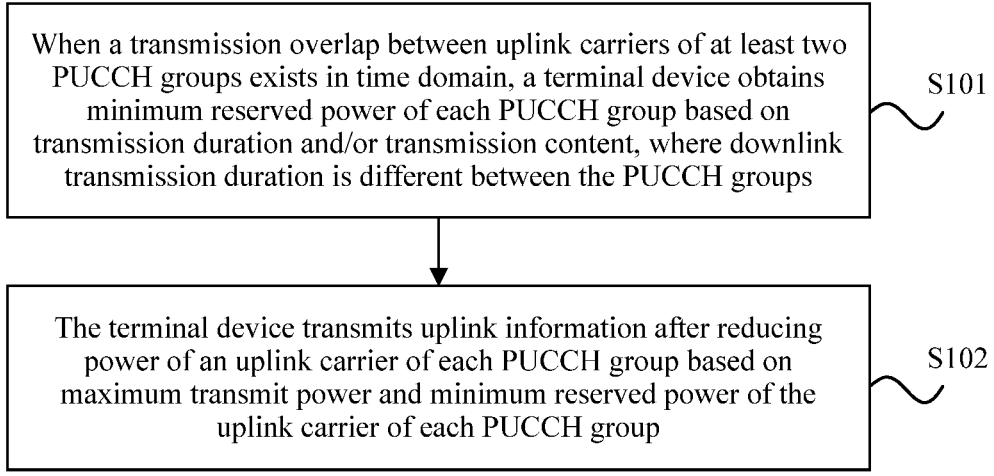
FIG. 2 is a schematic flowchart of Embodiment 1 of a transmit power control method according to this application.

FIG. 2 is a schematic flowchart of Embodiment 1 of a transmit power control method according to this application. The solution provided by this embodiment is used to perform power control when a transmission overlap between uplink carriers of a plurality of PUCCH groups occurs, that is, resolve a PUCCH collision of uplink carriers of different transmission duration between PUCCH groups. As shown in FIG. 2, the transmit power control method includes the following steps.

S101. When a transmission overlap between uplink carriers of at least two PUCCH groups exists in time domain, a terminal device obtains minimum reserved power of each PUCCH group based on transmission duration and/or transmission content, where downlink transmission duration is different between the PUCCH groups.

In this step, minimum reserved power of each PUCCH group needs to be obtained in advance, so that power control can be performed when a transmission overlap between uplink carriers of a plurality of PUCCH groups exists in time domain. Each PUCCH group is obtained by performing grouping based on downlink transmission duration. To be specific, transmission duration (also referred to as a transmission time interval (TTI)) of downlink carriers in a same PUCCH group is the same.

Minimum reserved power of a PUCCH group is related to transmission duration and transmission content of the group. Specifically, manners of obtaining the minimum reserved power of each PUCCH group by the terminal device include at least the following several manners:

In a first manner, if uplink transmission duration of all the PUCCH groups is the same, the terminal device determines the minimum reserved power of each PUCCH group based on downlink transmission duration of the group, where minimum reserved power of a PUCCH group whose downlink transmission duration is short is higher than minimum reserved power of a PUCCH group whose downlink transmission duration is long. A meaning of this solution is that, if a downlink TTI is shorter, the minimum reserved power of the PUCCH group is higher, and the terminal device may determine the minimum reserved power based on downlink transmission duration of each group.

In a second manner, if uplink transmission duration of all the PUCCH groups is different, the terminal device may determine the minimum reserved power of each PUCCH group directly based on uplink transmission duration, where minimum reserved power of a PUCCH group whose uplink transmission duration is short is higher than minimum reserved power of a PUCCH group whose uplink transmission duration is long. A meaning thereof is that, if an uplink TTI is shorter, the minimum reserved power of the PUCCH group is higher, and the terminal device may determine the minimum reserved power based on uplink transmission duration of each group.

In a third manner, when transmission content of the at least two PUCCH groups is different, the terminal device determines the minimum reserved power of each PUCCH group based on priorities of the transmission content, where the transmission content includes a hybrid automatic repeat request-acknowledgement (HARQ-ACK), a scheduling request (SR), channel state information (CSI), and data, and the priorities of the transmission content include: priorities of the HARQ-ACK and/or the SR, the CSI, and the data are in descending order.

In a specific implementation, if transmission content of uplink carriers of all the PUCCH groups is different, the terminal device may obtain the minimum reserved power of each PUCCH group based on the priorities of the transmission content. The priorities of the transmission content are as follows: A priority of a carrier carrying a HARQ-ACK and/or an SR is the highest, a priority of a carrier carrying CSI is the second highest, and a priority of a carrier carrying only data is the lowest. To be specific, the priorities of the transmission content HARQ-ACK and/or SR, CSI, and data are in descending order.

S102. The terminal device transmits uplink information after reducing power of an uplink carrier of each PUCCH group based on maximum transmit power and minimum reserved power of the uplink carrier of each PUCCH group.

After power reduction, if reduced power on an overlapping part of an uplink carrier of a first PUCCH group is lower than minimum reserved power of the first PUCCH group, information on the overlapping part of the uplink carrier of the first PUCCH group is discarded.

In this step, after the terminal device determines the minimum reserved power of each PUCCH group, the terminal device may reduce transmit power of the uplink carrier of each PUCCH group based on pre-specified total carrier power, that is, the maximum transmit power and the minimum reserved power of each PUCCH group. Power reduction degrees of the uplink carriers of the PUCCH groups are different. To be specific, uplink transmission of a carrier whose transmission duration is relatively short is preferentially ensured. If transmit power of an uplink carrier after power reduction in one or more first PUCCHs is lower than corresponding minimum reserved power thereof, that is, normal transmission cannot be performed, information on an overlapping part of the uplink carrier of the first PUCCH group is not transmitted.

Optionally, if the transmission overlap between the uplink carriers of the at least two PUCCH groups exists in time domain, and the overlap occurs at a start symbol of long transmission or an end symbol of long transmission, a physical uplink control channel of a carrier of long transmission duration is transmitted in a short format. A meaning thereof is: if one or more consecutive symbols at a start of long transmission overlap short transmission, after short transmission ends, a physical uplink control channel of long transmission is transmitted in a short format; or if the overlap occurs at one or more consecutive symbols before an end of long transmission, short transmission starts after a physical uplink control channel of long transmission is transmitted in a short format.

Specifically, transmission duration of short transmission is 2 symbols, and transmission duration of long transmission is 1 ms. Based on a currently agreed uplink subframe structure, when transmission duration is 2 symbols, duration of 6 TTIs in a subframe is 3 symbols, 2 symbols, 2 symbols, 2 symbols, 2 symbols, and 3 symbols respectively. When a transmission overlap between short transmission and long transmission occurs at a start of long transmission, that is, at first three symbols in a subframe, long transmission uses a short PUCCH format for transmission, and is performed after the short transmission ends; or if an overlap occurs at three symbols before an end of long transmission, long transmission uses a short PUCCH format for transmission, and short transmission is performed after long transmission is completed. Likewise, if a transmission overlap between short transmission and long transmission occurs at one symbol or two symbols, long transmission uses a short PUCCH format for transmission by using the same method.

Figure 3:
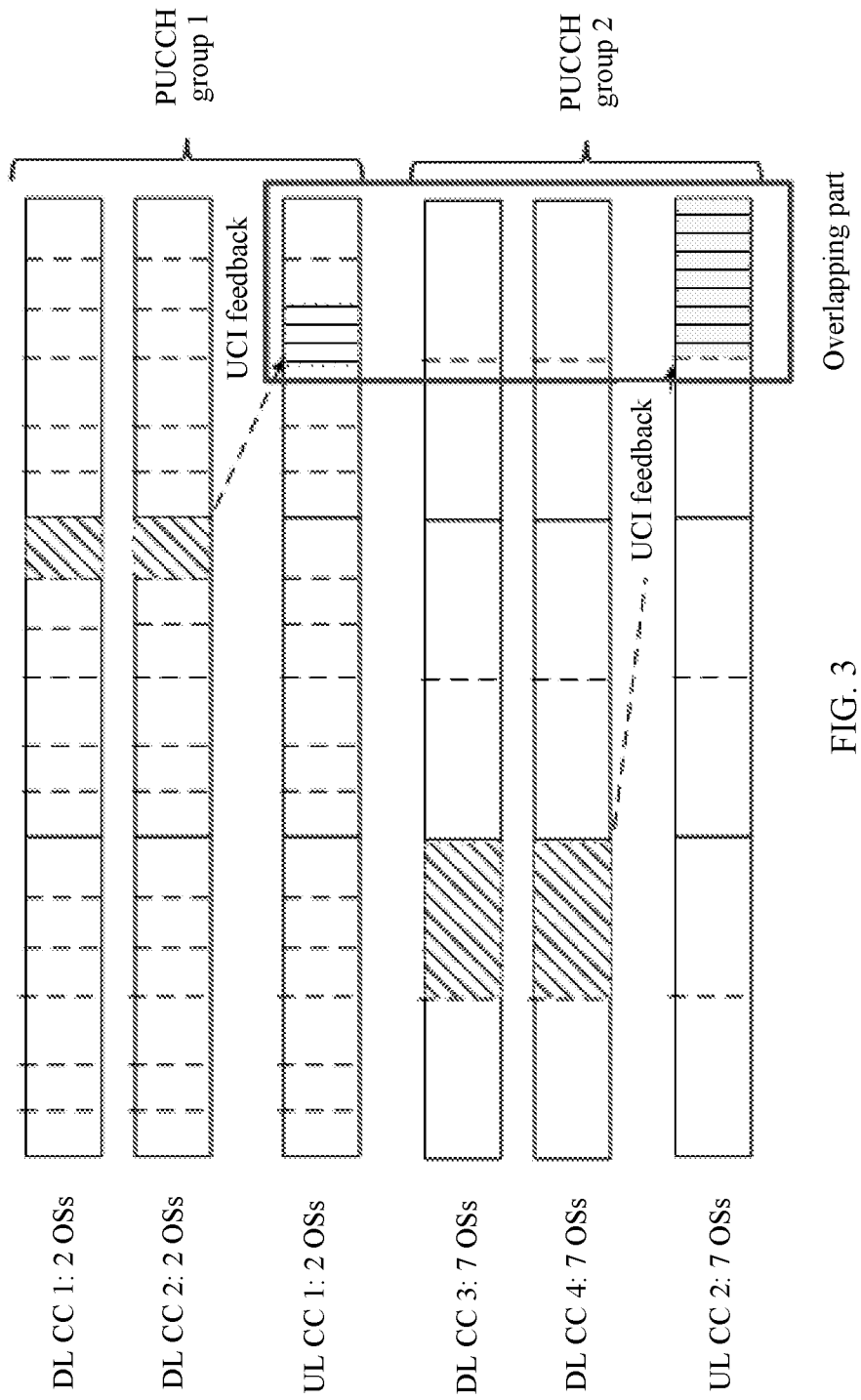
FIG. 3 is a schematic diagram in which a transmission overlap exists between PUCCH groups according to this application.

FIG. 3 is a schematic diagram in which a transmission overlap exists between PUCCH groups according to this application. As shown in FIG. 3, a transmission overlap occurs between PUCCHs of uplink carriers of different TTI duration in PUCCH groups in a short TTI (sTTI). Alternatively, in NR, because minimum units for transmission in different subcarrier spacings (SCSs) are different, as shown in FIG. 3, a transmission collision occurs between UCI feedback content in a PUCCH group 1 and UCI feedback content in a PUCCH group 2, where transmission duration of the PUCCH group 1 is short, and transmission duration of the PUCCH group 2 is longer than that of the PUCCH group 1. To be specific, a minimum unit (in a subsequent embodiment, transmission duration may be a transmission time interval TTI, different duration caused by different SCSs, a mini-slot, aggregation transmission duration, UCI retransmission duration, or the like) for transmitting information is relatively long. According to the solution of Embodiment 1, the power control solution provided by this application is as follows:

First, corresponding minimum reserved power w allocated in advance to each PUCCH group is obtained, where the PUCCH group is a PUCCH group obtained by performing grouping based on DLTTI duration. The minimum reserved power of each PUCCH group is related to TTI duration (SCS) of the group and transmitted UCI content.

For a PUCCH group, minimum reserved power of an uplink carrier of a group of short transmission is higher than minimum reserved power of an uplink carrier of a group of long transmission; and when a transmission overlap occurs, total power of all carriers cannot exceed maximum transmit power P, and power needs to be reduced proportionally. The reduced power cannot be lower than the minimum reserved power, to ensure that short transmission is smoothly performed. To be specific, it is preferentially ensured that short transmission is smoothly performed. Power of an uplink carrier of long transmission may be reduced, or power of uplink carriers of both long transmission and short transmission may be reduced. For short transmission, power is reduced less, but for long transmission, power is reduced more. To be specific, power on an overlapping part of an uplink carrier CC 1 (component carrier (CC)) of the PUCCH group 1 and power on an overlapping part of an uplink carrier CC 2 of the PUCCH group 2 in the figure may be reduced proportionally, to ensure normal transmission of information on the CC 1. A power reduction factor is related to the minimum reserved power, transmission duration, or a priority of transmission content.

Optionally, if TTI duration of uplink carriers of different PUCCH groups is the same, minimum reserved power may be determined based on downlink TTI duration of a group, where minimum reserved power of a carrier of short downlink TTI duration is higher than that of a carrier of long downlink TTI duration.

In addition, determining of the minimum reserved power is further related to UCI content carried on a PUCCH, and minimum reserved power of a carrier of a HARQ ACK/NACK is high.

Optionally, if there is no PUCCH group in NR, information is transmitted after power on an overlapping part between different subcarriers is reduced in a manner of "high minimum reserved power for a large SCS", that is, information in a large SCS is preferentially transmitted. If values of SCSs are the same, minimum reserved power is determined for different SCSs based on priorities of UCI content transmitted in the SCSs, where priorities of a HARQ-ACK and/or an SR, CSI, and data are in descending order, and minimum reserved power of an SCS of a higher priority is higher, that is, the HARQ-ACK and/or the SR are/is preferentially transmitted.

In the transmit power control method provided by this embodiment, a power control solution is provided to ensure that short transmission is smoothly performed when a transmission overlap between different PUCCH groups exists.

Embodiment 2

In a subsequent embodiment, transmission of relatively short TTI duration (a large SCS) is abbreviated to short transmission; and transmission of long TTI duration (a small SCS) is abbreviated to long transmission. In a short TTI, an uplink TTI may be 2, 4, or 7 symbols, and duration of a TTI in LTE is 14 symbols (that is, 1 millisecond). In this solution, long transmission and short transmission are in a relative relationship. In uplink carrier aggregation transmission, if 2 symbols overlap 7 symbols, the 2 symbols are short transmission, and the 7 symbols are long transmission; or if the 7 symbols overlap 1 ms, the 7 symbols are short transmission, and 1 ms is long transmission. In figures in subsequent implementations, 2 symbols and 7 symbols are used as an example for description. In NR, if an SCS is 15 kHz, it is long transmission; or if an SCS is 480 kHz, it is short transmission. This is similar to the case in LTE. Alternatively, a value of the SCS may be 30 kHz, 120 kHz, or the like. "Long" and "short" are also relative concepts.

This embodiment provides a transmit power control solution considering a type of a DMRS in transmission content and different cases about whether the DMRS overlaps.

When a transmission overlap between at least two channels exists in time domain, a terminal device performs power control based on transmission duration or transmission content of the at least two channels, and transmits uplink information, where a transmission priority of a channel whose transmission duration is short is higher than that of a channel whose transmission duration is long, or a priority of a channel carrying uplink control information is higher than that of a channel carrying other content, and the transmission content includes a demodulation reference signal DMRS.

The following uses two channels as an example for describing this solution. To be specific, the at least two channels include a first channel and a second channel, and transmission duration of the first channel is shorter than transmission duration of the second channel.

In a first case, a transmission overlapping part of the first channel and a transmission overlapping part of the second channel both use self-contained DMRSs for demodulation, a DMRS of the first channel and a DMRS of the second channel overlap, and transmission content on the transmission overlapping parts of the first channel and the second channel is the same; and in this case, that a terminal device performs power control based on transmission duration or transmission content of the at least two channels, and transmits uplink information includes at least the following control solutions:

(1) The terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned. A meaning of this solution is preferentially transmitting information of short transmission. To be specific, the uplink information on the first channel is preferentially transmitted. The power on the overlapping part of the second channel whose transmission duration is relatively long is reduced based on the pre-specified maximum transmit power, and total power on the overlapping part of the first channel and the overlapping part of the second channel after reduction is lower than or equal to the maximum transmit power. In this case, content on the overlapping part of the second channel is discarded if the power is insufficient to support DMRS demodulation. Because the DMRS also overlaps, the DMRS on the transmission overlapping part is discarded, and the information to be demodulated by using the DMRS cannot be demodulated correctly even if the information is transmitted to a receive end. Therefore, transmission of both the DMRS and the information to be demodulated by using the DMRS may be abandoned.

(2) The terminal device transmits information after reducing transmit power of the first channel based on maximum transmit power and a first proportion, and transmits information after reducing transmit power of the second channel based on a second proportion, where the first proportion is smaller than the second proportion. A difference between a meaning of this solution and the meaning of the foregoing solution lies in that, in this solution, both the power of the first channel and the power of the second channel are reduced, instead of reducing only the power of the second channel; however, a proportion of transmit power reduction on the first channel is smaller than a proportion of power reduction on the second channel, that is, the power of the first channel is reduced less, and it is preferentially ensured that information of short transmission on the first channel is transmitted.

In a second case, a transmission overlapping part of the first channel and a transmission overlapping part of the second channel both use self-contained DMRSs for demodulation, a DMRS of the first channel overlaps a DMRS of the second channel, the overlapping part of the first channel is a PUCCH, and the overlapping part of the second channel is a physical uplink shared channel (PUSCH) or a PUCCH; and in this case, that a terminal device performs power control based on transmission duration or transmission content of the at least two channels, and transmits uplink information includes at least the following control solutions:

(1) The terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned. Similar to that in the first case, a meaning of this solution is preferentially transmitting information of short transmission. To be specific, the uplink information on the first channel is preferentially transmitted. The power on the overlapping part of the second channel whose transmission duration is relatively long is reduced based on the pre-specified maximum transmit power. If the power is insufficient to support DMRS demodulation for content on the overlapping part of the second channel after reduction, transmission of both the DMRS and the information to be demodulated by using the DMRS is abandoned.

(2) The terminal device transmits information after reducing transmit power of the first channel based on maximum transmit power and a first proportion, and transmits information after reducing transmit power of the second channel based on a second proportion, where the first proportion is smaller than the second proportion. In this solution, both the power of the first channel and the power of the second channel are reduced, instead of reducing only the power of the second channel; however, a proportion of transmit power reduction on the first channel is smaller than a proportion of power reduction on the second channel, that is, the power of the first channel is reduced less, and it is preferentially ensured that information of short transmission on the first channel is transmitted.

In a third case, a transmission overlapping part of the first channel and a transmission overlapping part of the second channel both use self-contained DMRSs for demodulation, a DMRS of the first channel and a DMRS of the second channel overlap, and the overlapping parts of the first channel and the second channel are both PUSCHs, that is, both the two channels are data channels; and in this case, that a terminal device performs power control based on transmission duration or transmission content of the at least two channels, and transmits uplink information includes at least the following solutions:

(1) If the first channel carries UCI, the terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or the terminal device transmits information after reducing transmit power of the first channel based on maximum transmit power and a first proportion, and transmits information after reducing transmit power of the second channel based on a second proportion, where the first proportion is smaller than the second proportion.

(2) If the second channel carries UCI, the terminal device transmits uplink information on the second channel, and transmits uplink information after reducing, based on maximum transmit power, power on the overlapping part of the first channel that overlaps the second channel, where if the power on the overlapping part of the first channel after power reduction is insufficient to support DMRS demodulation, transmission of the DMRS and information to be demodulated by using the DMRS on the first channel is abandoned; or the terminal device transmits information after reducing transmit power of the first channel based on maximum transmit power and a first proportion, and transmits information after reducing transmit power of the second channel based on a second proportion, where the first proportion is greater than the second proportion.

(3) If the first channel and the second channel both carry UCI, the terminal device transmits uplink information based on priorities of UCI content, where the UCI content includes a HARQ-ACK, an SR, CSI, and data, and the priorities of the UCI content include: priorities of the HARQ-ACK and/or the SR, the CSI, and the data are in descending order. A meaning of this solution is as follows: When the first channel and the second channel both carry the UCI, transmission content on the two channels needs to be compared, and a channel whose power is to be reduced is determined based on priorities of the transmission content. For example, when the HARQ-ACK and/or the SR are/is transmitted on the first channel, and the CSI or the data is carried on the second channel, information on the first channel may be preferentially transmitted, and transmission is performed after power on an overlapping part of the second channel is reduced; or transmission is performed after power on an overlapping part of the first channel and power on an overlapping part of the second channel are both reduced, where a proportion of reduction on the first channel is relatively small, and transmission of information on the first channel is preferentially ensured.

For the first to the third cases, the following provides a specific example for description.

Figure 4:
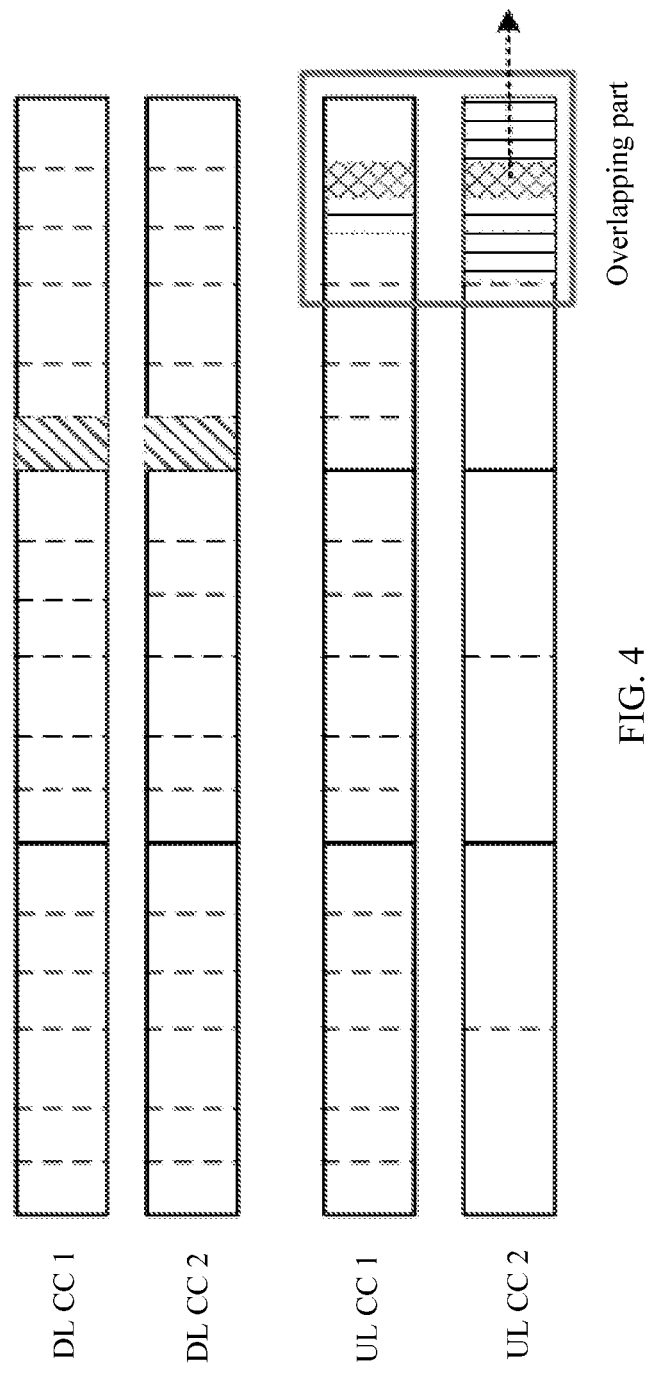
FIG. 4 is a schematic diagram in which each DMRS is self-contained and the DMRSs overlap in time domain locations according to this application.

FIG. 4 is a schematic diagram in which each DMRS is self-contained and the DMRSs overlap in time domain locations according to this application. As shown in FIG. 4, a transmission overlap between short transmission of a TTI m in a subframe n (in FIG. 4) and long transmission of a TTI m' in a subframe n' (in FIG. 4) exists in time domain, where n and n' may correspond to a same subframe number or different subframe numbers, overlapping parts are both configured with self-contained DMRSs for demodulation, and a self-contained DMRS of a short transmission CC 1 of a terminal device collides with a DMRS of a long transmission CC 2 in time domain locations during transmission. In this case, the following several solutions are provided according to the foregoing embodiment:

1. Power on the overlapping parts of both carriers cannot exceed maximum transmit power P. If transmission content (a DMRS, a UCI type, and data) of short transmission and long transmission is the same, the short transmission DMRS (of short TTI duration or large SCS) is preferentially transmitted, that is, the DMRS of the CC 1 in FIG. 4 is preferentially transmitted. Power on an overlapping part of long transmission is reduced. If the power is insufficient to support long transmission DMRS demodulation, long transmission is discarded, including a DMRS of the device and information to be demodulated by using the DMRS.

2. If other transmission content than the DMRSs is different, the transmission content on the overlapping parts is considered, specifically as follows:

If a PUCCH (that is, a first channel is a PUCCH) is transmitted on an overlapping part of the short transmission CC 1, and a PUSCH or a PUCCH (that is, a second channel is a PUSCH or a PUCCH) is transmitted on an overlapping part of the long transmission CC 2, short transmission is preferential. Power on the overlapping part of long transmission is reduced. If the power is insufficient to support long transmission DMRS demodulation, long transmission is discarded. To be specific, the DMRS and information to be demodulated by using the DMRS on the overlapping part of long transmission are both discarded.

If a PUSCH is transmitted on an overlapping part of the short transmission CC 1, and a PUSCH is transmitted on an overlapping part of the long transmission CC 2, whether PUSCHs of long transmission and short transmission carry UCI transmission is determined. If the short transmission CC 1 carries UCI transmission, short transmission is preferential, and power on the overlapping part of the long transmission CC 2 is reduced, where if the power is insufficient to support long transmission DMRS demodulation, the DMRS and information to be demodulated by using the DMRS on the overlapping part of long transmission are discarded; or if the long transmission CC 2 carries UCI transmission, long transmission is preferential, and power on the overlapping part of short transmission is reduced, where if the power is insufficient to support short transmission DMRS demodulation, the DMRS and information to be demodulated by using the DMRS on the overlapping part of short transmission are discarded.

3. Using 2-symbol short transmission as an example, if a short transmission DMRS collides with a long transmission DMRS, but not in a same symbol location, short transmission is preferential, and long transmission is discarded, or short transmission is discarded. A meaning of this solution is as follows: DMRSs of a first channel and a second channel both overlap, but a DMRS of the first channel overlaps the second channel on a first symbol of an overlapping part; and a DMRS of the second channel overlaps a second symbol on the overlapping part of the first channel of short transmission. In this case, transmission of information on one channel is preferentially ensured, and information on the other channel may be discarded.

In a fourth case, a transmission overlapping part of the first channel uses a shared DMRS for demodulation, a transmission overlapping part of the second channel uses a self-contained DMRS for demodulation, and the DMRS of the first channel does not overlap; and in this case, that a terminal device performs power control based on transmission duration or transmission content of the at least two channels, and transmits uplink information includes at least the following control solutions:

(1) The terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned. A meaning of this solution is as follows: The overlapping part of the first channel uses a shared DMRS for demodulation, and the DMRS does not overlap. It may be known that the DMRS used for decoding information on the overlapping part of the first channel can be transmitted normally. In this case, the information on the first channel is preferentially transmitted, that is, information of short transmission is preferentially transmitted. The power on the overlapping part of the second channel whose transmission duration is relatively long is reduced based on the pre-specified maximum transmit power, and total power on the overlapping part of the first channel and the overlapping part of the second channel after reduction is lower than or equal to the maximum transmit power. In this case, content on the overlapping part of the second channel is discarded if the power is insufficient to support DMRS demodulation. Because the DMRS of the second channel also overlaps, the DMRS on the transmission overlapping part is discarded, and the information to be demodulated by using the DMRS cannot be demodulated correctly even if the information is transmitted to a receive end. Therefore, transmission of both the DMRS and the information to be demodulated by using the DMRS may be abandoned.

(2) The terminal device transmits information after reducing transmit power of the first channel based on maximum transmit power and a first proportion, and transmits information after reducing transmit power of the second channel based on a second proportion, where the first proportion is smaller than the second proportion. A difference between a meaning of this solution and the meaning of the foregoing solution (1) lies in that, in this solution, the power of the first channel and the power of the second channel are both reduced. Because the DMRS used for demodulation on the overlapping part of the first channel has been transmitted successfully, normal transmission of the uplink information on the first channel needs to be preferentially ensured. Therefore, a proportion of transmit power reduction on the first channel is smaller than a proportion of power reduction on the second channel, that is, the power of the first channel is reduced less.

In a fifth case, a transmission overlapping part of the first channel uses a shared DMRS for demodulation, a transmission overlapping part of the second channel uses a self-contained DMRS for demodulation, the DMRS of the first channel does not overlap, the overlapping part of the first channel is a PUCCH, and the overlapping part of the second channel is a PUSCH or a PUCCH; and in this case, that a terminal device performs power control based on transmission duration or transmission content of the at least two channels, and transmits uplink information includes at least the following control solutions:

(1) The terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned. Similar to that in the fourth case, in this solution, DMRS information used on the overlapping part of the first channel does not overlap, and may be transmitted normally. Therefore, transmission of the first channel is preferential during power control, that is, short transmission is preferential. Power reduction processing is performed on the overlapping part of the second channel whose transmission duration is relatively long, and total power on the overlapping part of the first channel and the overlapping part of the second channel after reduction is lower than or equal to the maximum transmit power. In this case, if the power is insufficient to support DMRS demodulation for content on the overlapping part of the second channel, transmission of the DMRS and the information to be demodulated by using the DMRS on the overlapping part of the second channel is abandoned.

(2) The terminal device transmits information after reducing transmit power of the first channel based on maximum transmit power and a first proportion, and transmits information after reducing transmit power of the second channel based on a second proportion, where the first proportion is smaller than the second proportion. In this solution, the power of the first channel and the power of the second channel are both reduced. Because the DMRS used for demodulation on the overlapping part of the first channel has been transmitted successfully, normal transmission of the uplink information on the first channel needs to be preferentially ensured. Therefore, a proportion of transmit power reduction on the first channel is smaller than a proportion of power reduction on the second channel, that is, the power of the first channel is reduced less.

In a sixth case, a transmission overlapping part of the first channel uses a shared DMRS for demodulation, a transmission overlapping part of the second channel uses a self-contained DMRS for demodulation, the DMRS of the first channel does not overlap, and the first channel and the second channel are both PUSCHs; and in this case, that a terminal device performs power control based on transmission duration or transmission content of the at least two channels, and transmits uplink information includes at least the following control solutions:

(1) If the first channel carries UCI, the terminal device transmits uplink information on the first channel, and reduces, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or the terminal device transmits information after reducing transmit power of the first channel based on maximum transmit power and a first proportion, and transmits information after reducing transmit power of the second channel based on a second proportion, where the first proportion is smaller than the second proportion. If the first channel carries the UCI, short transmission is preferential. To be specific, normal transmission of the overlapping part of the first channel is preferentially ensured, and transmission is performed after the power on the overlapping part of the second channel is reduced, or transmission is performed after power on the overlapping part of the first channel and the power on the overlapping part of the second channel are both reduced, where a proportion of reduction on the first channel is relatively small, and therefore normal transmission of the overlapping part of the first channel may be ensured.

(2) If the second channel carries UCI, the terminal device transmits uplink information on the second channel, and transmits uplink information after reducing, based on maximum transmit power, power on the overlapping part of the first channel that overlaps the second channel; or the terminal device transmits information after reducing transmit power of the first channel based on maximum transmit power and a first proportion, and transmits information after reducing transmit power of the second channel based on a second proportion, where the first proportion is greater than the second proportion. If the second channel carries the UCI, long transmission is preferential. To be specific, normal transmission of the overlapping part of the second channel is preferentially ensured, and transmission is performed after the power on the overlapping part of the first channel is reduced, or transmission is performed after the power on the overlapping part of the first channel and power on the overlapping part of the second channel are both reduced, where a proportion of reduction on the first channel is relatively large, and therefore normal transmission of the overlapping part of the second channel may be ensured.

(3) If the first channel and the second channel both carry UCI, the terminal device transmits uplink information based on priorities of UCI content, where the UCI content includes a HARQ-ACK, an SR, CSI, and data, and the priorities of the UCI content include: priorities of the HARQ-ACK and/or the SR, the CSI, and the data are in descending order.

For the fourth to the sixth cases, the following provides a specific example for description.

Figure 5:
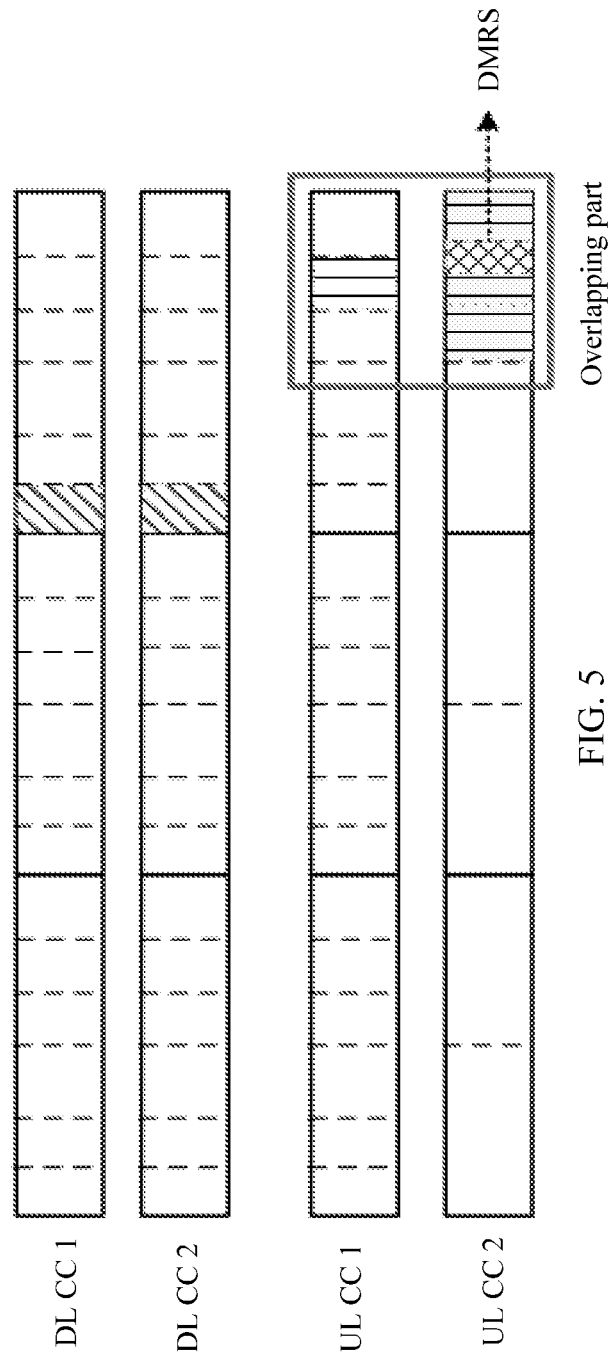
FIG. 5 is a schematic diagram in which a short transmission DMRS is shared, a long transmission DMRS is self-contained, and the short transmission DMRS does not overlap in a time domain location according to this application.

FIG. 5 is a schematic diagram in which a short transmission DMRS is shared, a long transmission DMRS is self-contained, and the short transmission DMRS does not overlap in a time domain location according to this application. As shown in FIG. 5, a transmission overlap between short transmission (an uplink transmission UL CC 1) of a TTI m in a subframe n and long transmission (an uplink transmission UL CC 2) of a TTI m' in the subframe n exists in time domain, a DMRS on an overlapping part of short transmission is a shared DMRS, an overlapping part of long transmission is a self-contained DMRS, and the short transmission DMRS does not collide. In this case, the following several solutions are provided according to the foregoing embodiment:

1. Power on the overlapping parts of both carriers cannot exceed maximum transmit power P, and the short transmission shared DMRS may be transmitted successfully. In this case, the short transmission CC 1 is preferential, and power on the overlapping part of the long transmission CC 2 is reduced. If the power is insufficient to support long transmission DMRS demodulation, the DMRS and information to be demodulated by using the DMRS on the overlapping part of long transmission CC 2 are discarded.

2. Transmission content is compared. Power on the overlapping parts of both carriers (CC 1 and CC 2) cannot exceed maximum transmit power P. If the transmission content is the same, the short transmission CC 1 is preferential, and power on the overlapping part of the long transmission CC 2 is reduced. If the power is insufficient to support long transmission DMRS demodulation, long transmission is abandoned, to be specific, the DMRS and information to be demodulated by using the DMRS on the overlapping part of the long transmission CC2 are discarded.

If a PUCCH (that is, a first channel is a PUCCH) is transmitted on the overlapping part of the short transmission CC 1, and a PUSCH or a PUCCH (that is, a second channel is a PUSCH or a PUCCH) is transmitted on the overlapping part of the long transmission CC 2, short transmission is preferential, and power on the overlapping part of long transmission is reduced. If the power is insufficient to support long transmission DMRS demodulation, long transmission is discarded.

If a PUSCH is transmitted on the overlapping part of the short transmission CC 1, and a PUSCH is transmitted on the overlapping part of the long transmission CC 2, whether the PUSCHs carry UCI transmission is determined. If short transmission carries UCI transmission, short transmission is preferential, and power on the overlapping part of long transmission is reduced, where if the power is insufficient to support long transmission DMRS demodulation, long transmission is discarded; or if long transmission carries UCI transmission, long transmission is preferential, and power on the overlapping part of short transmission is reduced. Because the DMRS has been transmitted successfully, demodulation may be directly performed.

In a seventh case, an overlapping part of the first channel uses a shared DMRS for demodulation, a transmission overlapping part of the second channel uses a self-contained DMRS for demodulation, the DMRS of the first channel overlaps, and transmission content on the transmission overlapping parts of the first channel and the second channel is the same; and in this case, that a terminal device performs power control based on transmission duration or transmission content of the at least two channels, and transmits uplink information includes at least the following control solutions:

(1) The terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, the DMRS and information to be demodulated by using the DMRS on the second channel are abandoned. When content transmitted on the first channel and the second channel is the same, short transmission is preferential. To be specific, transmission on the overlapping part of the first channel is preferential, and power reduction processing is performed on the overlapping part of the second channel. If DMRS demodulation cannot be supported after power reduction, the DMRS and the information to be demodulated by using the DMRS on the second channel are abandoned.

(2) The terminal device transmits information after reducing transmit power of the first channel based on maximum transmit power and a first proportion, and transmits information after reducing transmit power of the second channel based on a second proportion, where the first proportion is smaller than the second proportion. When content transmitted on the first channel and the second channel is the same, short transmission is preferential. To be specific, information on the overlapping part of the first channel may be preferentially transmitted normally; and power reduction processing is performed on both the overlapping part of the first channel and the overlapping part of the second channel, where a proportion of reduction on the overlapping part of the first channel is relatively small.

In an eighth case, an overlapping part of the first channel uses a shared DMRS for demodulation, a transmission overlapping part of the second channel uses a self-contained DMRS for demodulation, the DMRS of the first channel overlaps, the overlapping part of the first channel is a PUCCH, and the overlapping part of the second channel is a PUSCH or a PUCCH; and in this case, that a terminal device performs power control based on transmission duration or transmission content of the at least two channels, and transmits uplink information includes at least the following control solutions:

(1) The terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned.

(2) The terminal device transmits information after reducing transmit power of the first channel based on maximum transmit power and a first proportion, and transmits information after reducing transmit power of the second channel based on a second proportion, where the first proportion is smaller than the second proportion.

In a ninth case, an overlapping part of the first channel uses a shared DMRS for demodulation, a transmission overlapping part of the second channel uses a self-contained DMRS for demodulation, the DMRS of the first channel overlaps, and the overlapping part of the first channel and the overlapping part of the second channel are both PUSCHs; and in this case, that a terminal device performs power control based on transmission duration or transmission content of the at least two channels, and transmits uplink information includes at least the following solutions:

(1) If the first channel carries UCI, the terminal device transmits uplink information on the first channel, and transmits uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or the terminal device transmits information after reducing transmit power of the first channel based on maximum transmit power and a first proportion, and transmits information after reducing transmit power of the second channel based on a second proportion, where the first proportion is smaller than the second proportion. When the first channel carries the UCI, it is preferentially ensured that the information on the first channel whose transmission duration is relatively short can be normally transmitted.

(2) If the PUSCH of the second channel carries UCI, the terminal device transmits an uplink information on the second channel, and transmits uplink information after reducing, based on maximum transmit power, power on the overlapping part of the first channel that overlaps the second channel, where if the power on the overlapping part of the first channel after power reduction is insufficient to support channel demodulation by using the DMRS, transmission of information to be demodulated by using the DMRS on the first channel is abandoned; or the terminal device transmits information after reducing transmit power of the first channel based on maximum transmit power and a first proportion, and transmits information after reducing transmit power of the second channel based on a second proportion, where the first proportion is greater than the second proportion. When the second channel carries the UCI, it is preferentially ensured that the information on the second channel whose transmission duration is relatively long can be normally transmitted.

(3) If the first channel and the second channel both carry UCI, the terminal device transmits uplink information based on priorities of UCI content, where the UCI content includes a HARQ-ACK, an SR, CSI, and data, and the priorities of the UCI content include: priorities of the HARQ-ACK and/or the SR, the CSI, and the data are in descending order.

For the seventh to the ninth cases, the following provides a specific example for description.

Figure 6:
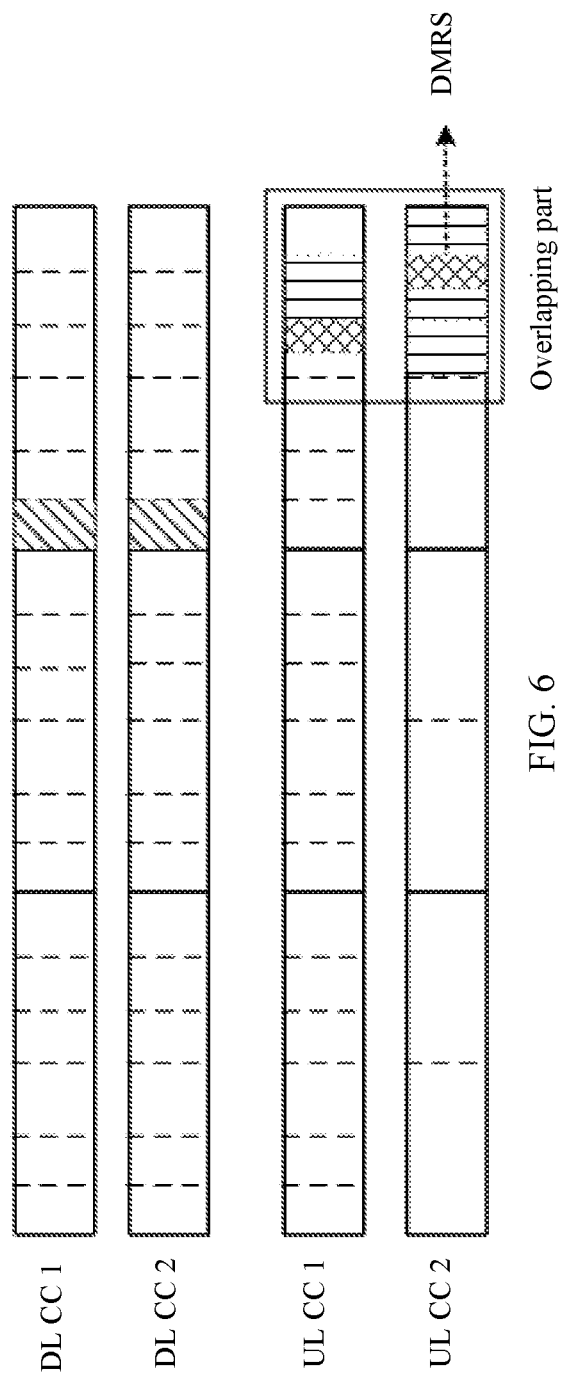
FIG. 6 is a schematic diagram in which a short transmission DMRS is shared, a long transmission DMRS is self-contained, and the short transmission DMRS overlaps in a time domain location according to this application.

FIG. 6 is a schematic diagram in which a short transmission DMRS is shared, a long transmission DMRS is self-contained, and the short transmission DMRS overlaps in a time domain location according to this application. As shown in FIG. 6, a transmission overlap between short transmission (an uplink transmission UL CC 1) of a TTI m in a subframe n and long transmission (an uplink transmission UL CC 2) of a TTI m' in the subframe n exists in time domain, a DMRS on an overlapping part of the short transmission CC 1 is a shared DMRS, overlapping part of the long transmission CC 2 is a self-contained DMRS, and the short transmission DMRS also collides. In this case, the following several solutions are provided according to the foregoing embodiment:

1. Power on the overlapping parts of both carriers cannot exceed maximum transmit power P. If transmission content (a DMRS, a UCI type, and data) of short transmission and long transmission is the same, the DMRS of the short transmission CC 1 (short TTI duration or large SCS) is preferentially transmitted, and power on the overlapping part of long transmission is reduced. If the power is insufficient to support long transmission DMRS demodulation, long transmission is discarded. To be specific, transmission of information on the overlapping part of the CC 1 is preferentially ensured, and power reduction processing is performed on the overlapping part of the CC 2. If the overlapping part of the CC 2 after power reduction cannot support DMRS demodulation, the DMRS and information to be demodulated by using the DMRS on the overlapping part are discarded.

2. If other transmission content than the DMRSs is different, it is considered that control is performed based on transmission content on the overlapping parts.

If a PUCCH is transmitted on the overlapping part of the short transmission CC 1, and a PUSCH or a PUCCH is transmitted on the overlapping part of the long transmission CC 2, short transmission is preferential, and power on the overlapping part of long transmission is reduced. If the power is insufficient to support long transmission DMRS demodulation, long transmission is discarded.

If a PUSCH is transmitted on the overlapping part of the short transmission CC 1, and a PUSCH is transmitted on the overlapping part of the long transmission CC 2, whether the PUSCH of long transmission or the PUSCH of short transmission carries UCI transmission is determined. If the short transmission CC 1 carries UCI transmission, short transmission is preferential, and power on the overlapping part of long transmission is reduced, where if the power is insufficient to support long transmission DMRS demodulation, long transmission is discarded; or if long transmission carries UCI transmission, long transmission is preferential, and power on the overlapping part of short transmission is reduced, where if the power is insufficient to support short transmission DMRS demodulation, short transmission is discarded.

In a tenth case, an overlapping part of the first channel uses a self-contained DMRS for demodulation, the second channel uses a shared DMRS for demodulation, and the DMRS of the second channel does not overlap; and in this case, that a terminal device performs power control based on transmission duration or transmission content of the at least two channels, and transmits uplink information includes at least the following solutions:

(1) If the DMRS of the second channel is transmitted successfully, the terminal device transmits uplink information on the second channel, and transmits uplink information after reducing, based on maximum transmit power, power on the overlapping part of the first channel that overlaps the second channel, where if the power on the overlapping part of the first channel after power reduction is insufficient to support channel demodulation by using the DMRS, transmission of the DMRS and information to be demodulated by using the DMRS on the first channel is abandoned. A meaning of this solution is as follows: Because the DMRS used by the second channel of long transmission for demodulation has been transmitted successfully, transmission of information on an overlapping part of the second channel is preferentially ensured, and power reduction processing is performed on the first channel.

(2) The terminal device transmits information after reducing transmit power of the first channel based on maximum transmit power and a first proportion, and transmits information after reducing transmit power of the second channel based on a second proportion, where the first proportion is greater than the second proportion.

In an eleventh case, an overlapping part of the first channel uses a self-contained DMRS for demodulation, an overlapping part of the second channel uses a shared DMRS for demodulation, the DMRS of the second channel does not overlap, and transmission content on the transmission overlapping parts of the first channel and the second channel is the same; and in this case, that a terminal device performs power control based on transmission duration or transmission content of the at least two channels, and transmits uplink information includes at least the following solutions:

(1) The terminal device transmits uplink information on the first channel, and transmits uplink information after reducing, based on maximum transmit power, power on the overlapping part of the second channel that overlaps the first channel. Short transmission is preferential. Because the DMRS on the second channel of long transmission has been transmitted successfully, the uplink information transmitted after power reduction may be directly demodulated by using the DMRS.

(2) The terminal device transmits information after reducing transmit power of the first channel based on maximum transmit power and a first proportion, and transmits information after reducing transmit power of the second channel based on a second proportion, where the first proportion is smaller than the second proportion. In addition, power reduction processing is performed on both the overlapping part of the first channel and the overlapping part of the second channel, to ensure normal transmission of the DMRS on the first channel. Therefore, a proportion of reduction on the overlapping part of the first channel is relatively small.

In a twelfth case, an overlapping part of the first channel uses a self-contained DMRS for demodulation, an overlapping part of the second channel uses a shared DMRS for demodulation, the DMRS of the second channel does not overlap, the overlapping part of the first channel is a PUCCH, and the overlapping part of the second channel is a PUSCH or a PUCCH; and in this case, that a terminal device performs power control based on transmission duration or transmission content of the at least two channels, and transmits uplink information includes at least the following solutions:

(1) The terminal device transmits uplink information on the first channel, and transmits uplink information after reducing, based on maximum transmit power, power on the overlapping part of the second channel that overlaps the first channel.

(2) The terminal device transmits information after reducing transmit power of the first channel based on maximum transmit power and a first proportion, and transmits information after reducing transmit power of the second channel based on a second proportion, where the first proportion is smaller than the second proportion.

In a thirteenth case, an overlapping part of the first channel uses a self-contained DMRS for demodulation, an overlapping part of the second channel uses a shared DMRS for demodulation, the DMRS of the second channel does not overlap, and the overlapping parts of the first channel and the second channel are both PUSCHs; and in this case, that a terminal device performs power control based on transmission duration or transmission content of the at least two channels, and transmits uplink information includes at least the following solutions:

(1) If the first channel carries UCI, the terminal device transmits uplink information on the first channel, and transmits uplink information after reducing, based on maximum transmit power, power on the overlapping part of the second channel that overlaps the first channel; or the terminal device transmits information after reducing transmit power of the first channel based on maximum transmit power and a first proportion, and transmits information after reducing transmit power of the second channel based on a second proportion, where the first proportion is smaller than the second proportion.

(2) If the second channel carries UCI, the terminal device transmits uplink information on the second channel, and transmits uplink information after reducing, based on maximum transmit power, power on the overlapping part of the first channel that overlaps the second channel, where if the power on the overlapping part of the first channel after power reduction is insufficient to support channel demodulation by using the DMRS, transmission of the DMRS and information to be demodulated by using the DMRS on the first channel is abandoned; or the terminal device transmits information after reducing transmit power of the first channel based on maximum transmit power and a first proportion, and transmits information after reducing transmit power of the second channel based on a second proportion, where the first proportion is greater than the second proportion.

(3) If the first channel and the second channel both carry UCI, the terminal device transmits uplink information based on priorities of UCI content, where the UCI content includes a HARQ-ACK, an SR, CSI, and data, and the priorities of the UCI content include: priorities of the HARQ-ACK and/or the SR, the CSI, and the data are in descending order.

In the foregoing several solutions, because the DMRS used by the second channel of long transmission for demodulation has been transmitted successfully, in a case of power reduction on the second channel, the transmitted uplink information may be demodulated by using the DMRS that has been transmitted. Therefore, the information on the overlapping part of the second channel does not need to be discarded. However, the DMRS of the first channel also overlaps. Therefore, if the reduced power is insufficient to support DMRS demodulation, transmission of the DMRS and the information to be demodulated by using the DMRS on the overlapping part of the first channel is abandoned.

For the tenth to the thirteenth cases, the following provides a specific example for description.

Figure 7:
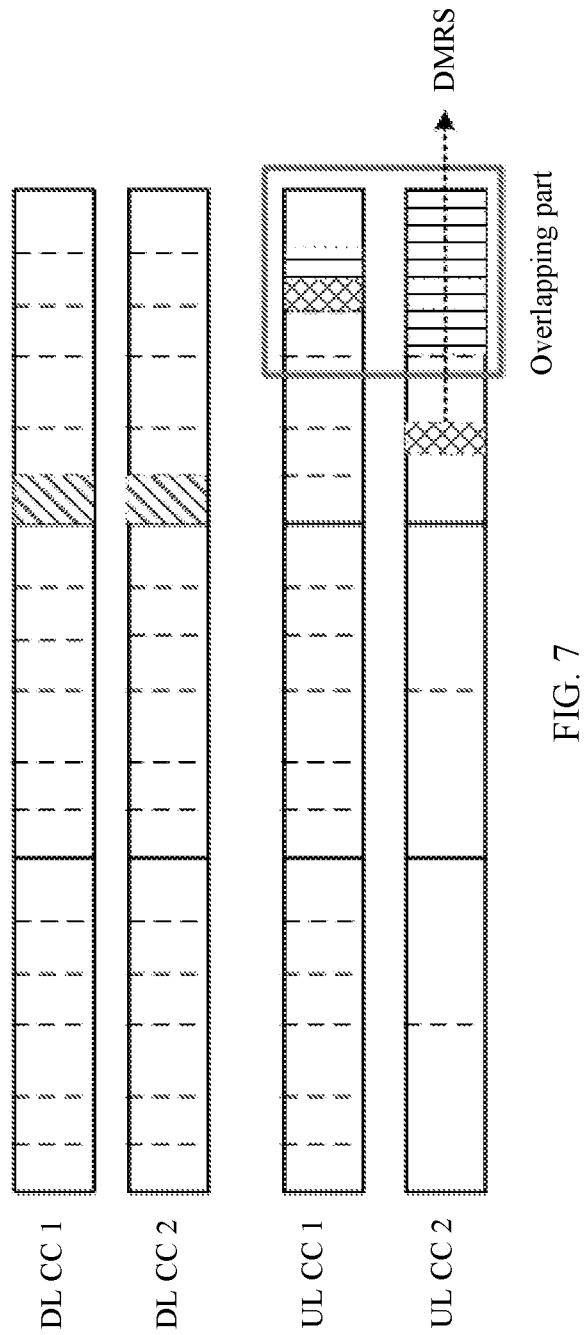
FIG. 7 is a schematic diagram in which a short transmission DMRS is shared, a long transmission DMRS is self-contained, and the long transmission DMRS does not overlap in a time domain location according to this application.

FIG. 7 is a schematic diagram in which a short transmission DMRS is shared, a long transmission DMRS is self-contained, and the long transmission DMRS does not overlap in a time domain location according to this application. As shown in FIG. 7, a transmission overlap between short transmission (an uplink UL CC 1) of a TTI m in a subframe n and long transmission (an uplink UL CC 2) of a TTI m' in the subframe n exists in time domain, a DMRS on an overlapping part of short transmission is a self-contained DMRS, an overlapping part of long transmission is a shared DMRS, and the long transmission DMRS does not collide. In this case, the following several solutions are provided according to the foregoing embodiment:

1. Because the DMRS of the long transmission CC 2 has been transmitted successfully, long transmission is preferential, and power on the overlapping part of the short transmission CC 1 is reduced. If the power is insufficient to support short transmission DMRS demodulation, short transmission is discarded.

2. Power on the overlapping parts of both carriers cannot exceed maximum transmit power P. Transmission content is compared. If the transmission content is the same, the short transmission CC 1 is preferential, and power on the overlapping part of the long transmission CC 2 is reduced. Because the DMRS has been transmitted successfully, demodulation is directly performed.

3. If transmission content is different, power control is performed based on the transmission content.

If a PUCCH is transmitted on the overlapping part of the short transmission CC 1, and a PUSCH or a PUCCH is transmitted on the overlapping part of the long transmission CC 2, transmission of information on the overlapping part of the short transmission CC 1 is preferentially ensured, and power on the overlapping part of the long transmission CC 2 is reduced. Because the DMRS has been transmitted successfully, demodulation may be directly performed.

If a PUSCH is transmitted on the overlapping part of the short transmission CC 1, and a PUSCH is transmitted on the overlapping part of the long transmission CC 2, whether the PUSCH of long transmission or the PUSCH of short transmission carries UCI transmission is determined. If the short transmission CC 1 carries UCI transmission, short transmission is preferential, and power on the overlapping part of long transmission is reduced, where because the DMRS has been transmitted successfully, demodulation may be directly performed; or if the long transmission CC 2 carries UCI transmission, long transmission is preferential, and power on the overlapping part of short transmission is reduced, where if the power is insufficient to support short transmission DMRS demodulation, short transmission is discarded.

In a fourteenth case, a transmission overlapping part of the first channel and a transmission overlapping part of the second channel both use shared DMRSs for demodulation, and a DMRS of the first channel does not collide with a DMRS of the second channel; and in this case, that a terminal device performs power control based on transmission duration or transmission content of the at least two channels, and transmits uplink information includes at least the following solutions:

(1) The terminal device transmits uplink information on the first channel, and transmits uplink information after reducing, based on maximum transmit power, power on the overlapping part of the second channel that overlaps the first channel.

(2) The terminal device transmits information after reducing transmit power of the first channel based on maximum transmit power and a first proportion, and transmits information after reducing transmit power of the second channel based on a second proportion, where the first proportion is smaller than the second proportion.

(3) If the first channel carries UCI, the terminal device transmits uplink information on the first channel, and transmits uplink information after reducing, based on maximum transmit power, power on the overlapping part of the second channel that overlaps the first channel.

(4) If the second channel carries UCI, the terminal device transmits uplink information on the second channel, and transmits uplink information after reducing, based on maximum transmit power, power on the overlapping part of the first channel that overlaps the second channel.

(5) If the first channel and the second channel both carry UCI, the terminal device transmits uplink information based on priorities of UCI content, where the UCI content includes a HARQ-ACK, an SR, CSI, and data, and the priorities of the UCI content include: priorities of the HARQ-ACK and/or the SR, the CSI, and the data are in descending order.

In the foregoing several solutions, because neither the DMRS of the first channel nor the DMRS of the second channel overlaps, during power control, only transmission content or transmission duration on the overlapping parts needs to be considered. Short transmission may be preferential, or transmission of information on the channel carrying UCI is preferential.

For this solution, a specific example is provided for description.

Figure 8:
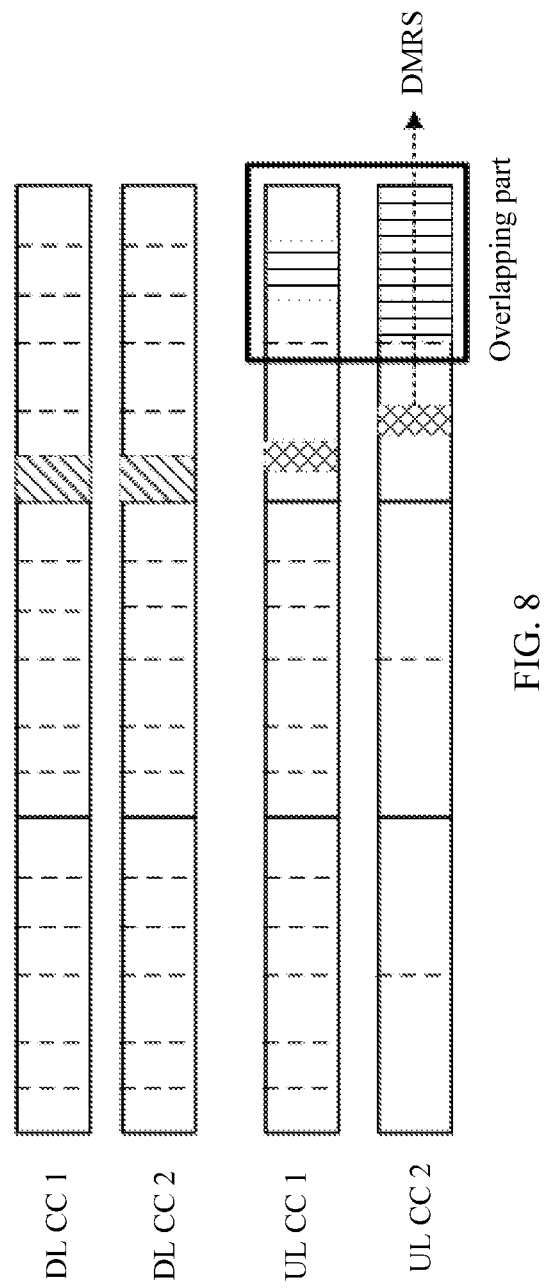
FIG. 8 is a schematic diagram in which a short transmission DMRS and a long transmission DMRS are both shared, and the long transmission DMRS and the short transmission DMRS do not overlap in time domain locations according to this application.

FIG. 8 is a schematic diagram in which a short transmission DMRS and a long transmission DMRS are both shared, and the long transmission DMRS and the short transmission DMRS do not overlap in time domain locations according to this application. As shown in FIG. 8, a transmission overlap between a short transmission CC 1 of a TTI m in a subframe n and a long transmission CC 2 of a TTI m' in the subframe n exists in time domain, a DMRS on an overlapping part of short transmission and a DMRS on an overlapping part of long transmission are both shared DMRSs, and the shared DMRSs of short transmission and long transmission do not collide. In this case, no DMRS overlapping exists, and it is only necessary to compare transmission content and TTI duration (SCS) and perform power control. Short transmission may be preferential, and transmission is performed after power on the overlapping part of long transmission is reduced, or uplink transmission of a carrier carrying UCI may be preferentially performed, and transmission may be performed after power on the overlapping part of the other carrier is reduced.

In a fifteenth case, a transmission overlapping part of the first channel and a transmission overlapping part of the second channel both use shared DMRSs for demodulation, and a DMRS of the first channel collides with a DMRS of the second channel; and in this case, that a terminal device performs power control based on transmission duration or transmission content of the at least two channels, and transmits uplink information includes at least the following solutions:

(1) The terminal device transmits uplink information on the first channel, and transmits information after reducing power on the DMRS of the second channel based on maximum transmit power, where if the power on the overlapping part of the second channel after power reduction is insufficient to support channel demodulation by using the DMRS, transmission of information to be demodulated by using the DMRS on the second channel is abandoned. Because the DMRS of the first channel and the DMRS of the second channel both overlap, in this solution, transmission of the uplink information on the first channel is preferentially ensured, and power reduction processing is performed on the second channel of long transmission. If the reduced power is insufficient to support DMRS demodulation, transmission of the DMRS and the information to be demodulated by using the DMRS on the second channel is abandoned.

(2) The terminal device transmits information after reducing transmit power of the first channel based on maximum transmit power and a first proportion, and transmits information after reducing transmit power of the second channel based on a second proportion, where the first proportion is smaller than the second proportion. Optionally, power reduction may be performed on each channel, but transmission of the uplink information on the first channel whose transmission duration is relatively short is preferentially ensured, and a proportion of power reduction on the first channel is relatively small.

For this solution, a specific example is provided for description.

Figure 9:
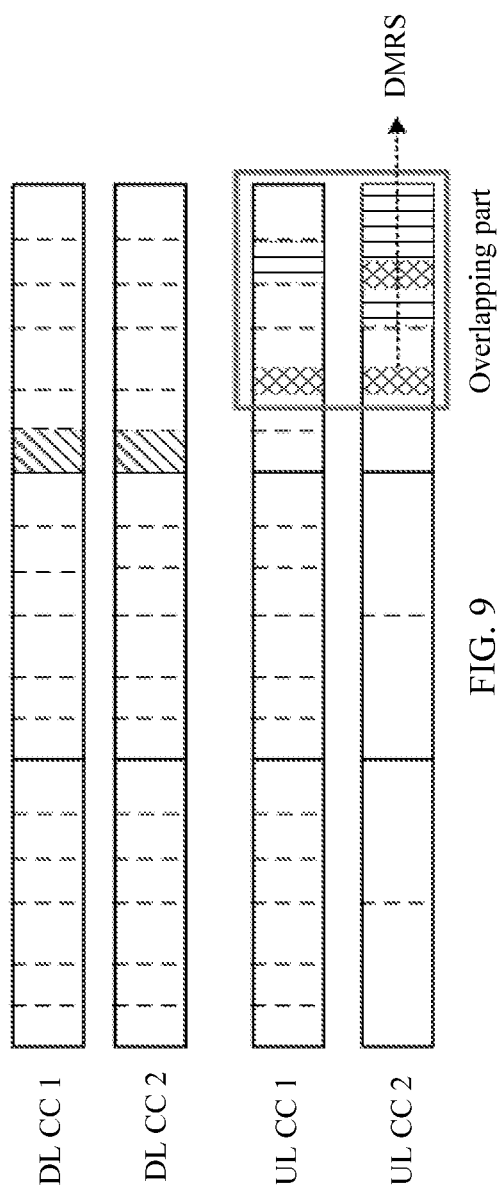
FIG. 9 is a schematic diagram in which a short transmission DMRS and a long transmission DMRS are both shared, and the long transmission DMRS and the short transmission DMRS both overlap in time domain locations according to this application.

FIG. 9 is a schematic diagram in which a short transmission DMRS and a long transmission DMRS are both shared, and the long transmission DMRS and the short transmission DMRS both overlap in time domain locations according to this application. As shown in FIG. 9, a transmission overlap between a short transmission CC 1 of a TTI m in a subframe n and a long transmission CC 2 of a TTI m' in the subframe n exists in time domain, a DMRS on an overlapping part of the short transmission CC 1 and a DMRS on an overlapping part of the long transmission CC 2 are both shared DMRSs, and the shared DMRSs of the short transmission CC 1 and the long transmission CC 2 also collide. In this case, the shared DMRS of the short transmission CC 1 is preferential, and power reduction is performed on the long transmission DMRS. If the power is insufficient to support transmission of the long transmission DMRS, the long transmission DMRS is discarded. In this case, because the long transmission DMRS for demodulation is discarded and demodulation cannot be performed, long transmission is directly discarded, that is, transmission of information to be demodulated by using the DMRS is also abandoned. If the long transmission DMRS after power reduction can be transmitted, short transmission on the overlapping part is preferential, and long transmission is performed after power on the overlapping part is reduced.

The foregoing Embodiment 2 provides power control solutions in various cases, and all the power control solutions provided by this application are described in a case of two channels (or two carriers). In an actual application, if a collision in any one of the foregoing cases occurs on a plurality of channels, all the foregoing solutions are applicable to power control. Based on transmission duration, it may be determined that information transmission on a channel of short transmission is preferentially ensured, and transmission may be performed on one or more other channels after power reduction; or based on content transmitted on a channel, information transmission on a channel carrying UCI is preferential, and power reduction processing is performed on an overlapping part of one or more other channels according to the foregoing solution. This power control solution resolves a collision between short transmission and a DMRS in a transmission process of another uplink carrier, ensures transmit power of the DMRS, and is more advantageous to information demodulation.

Embodiment 3

The second channel includes a channel for slot aggregation transmission or uplink control information UCI retransmission; and in this case, that a terminal device performs power control based on transmission duration or transmission content of the at least two channels, and transmits uplink information includes: transmitting, by the terminal device, uplink information on the first channel, and reducing, based on maximum transmit power, power on an overlapping part of the second channel that overlaps the first channel, where after power reduction, if the power on the overlapping part of the second channel that overlaps the first channel is lower than preset minimum reserved power, information on the overlapping part of the second channel that overlaps the first channel is discarded. In this solution, transmission duration of the first channel is shorter than transmission duration of a slot aggregation transmission carrier or the UCI repetition carrier. Power reduction processing is performed on an overlapping part of the slot aggregation transmission carrier or the UCI repetition carrier. If the power on the overlapping part of the slot aggregation transmission carrier or the UCI repetition carrier that overlaps the first carrier is lower than the preset minimum reserved power, information on the overlapping part of the slot aggregation transmission carrier or the UCI repetition carrier that overlaps the first carrier is discarded. A priority of the first channel is higher than that of the channel for slot aggregation transmission or uplink control information UCI retransmission.

The NR standard allows transmission in slot aggregation (slot aggregation) and UCI repetition modes. Slot aggregation means that a data channel or a control channel may occupy a plurality of TTIs for transmission, and is also referred to as aggregation transmission. UCI repetition means that uplink control information may be retransmitted in a plurality of TTIs. When a transmission overlap between slot aggregation transmission or UCI retransmission and another short transmission carrier occurs, short transmission is preferential; and transmission on an overlapping part of slot aggregation transmission or UCI retransmission that is long transmission is performed after power reduction, or an overlapping part of slot aggregation transmission or UCI retransmission is directly discarded.

For this solution, a specific example is provided for description.

Figure 10:
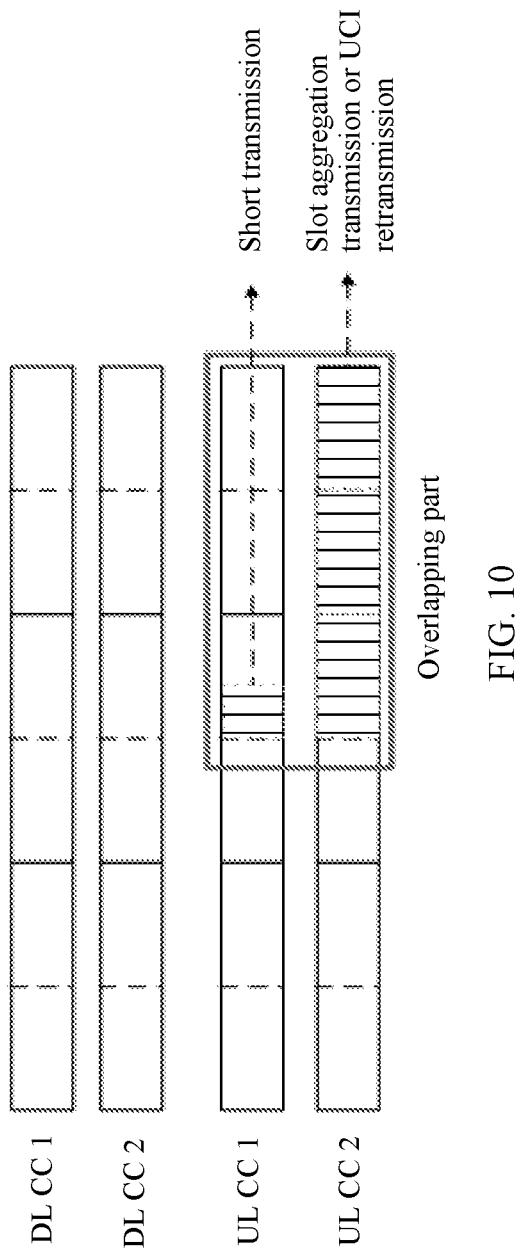
FIG. 10 is a schematic diagram in which an overlap occurs between slot aggregation transmission or UCI repetition and short transmission in time domain locations according to this application.

FIG. 10 is a schematic diagram in which an overlap occurs between slot aggregation transmission or UCI repetition and short transmission in time domain locations according to this application. As shown in FIG. 10, if transmission in a mini-slot, a slot, or different SCSs (that is, short transmission) of another carrier CC 1 collides with slot aggregation or UCI repetition, priorities of the following two types of transmission are defined: A priority of slot aggregation transmission or UCI repetition is lower than a priority of short transmission; and when a transmission collision in time domain occurs, an overlapping part of slot aggregation transmission or UCI retransmission may be directly discarded, or transmission is performed after power reduction. Therefore, normal transmission of uplink information on a short transmission carrier is ensured.

This solution is also applicable to a case in which a plurality of TTIs are scheduled in a short TTI. If single-TTI transmission on a carrier collides with multi-TTI scheduling transmission on another carrier, a priority of multi-TTI scheduling transmission is lower than a priority of short transmission, that is, transmission of uplink information in a single TTI is preferential.

Figure 11:
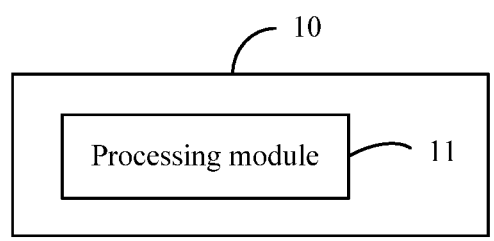
FIG. 11 is a schematic structural diagram of a transmit power control apparatus according to this application.

FIG. 11 is a schematic structural diagram of a transmit power control apparatus according to this application. As shown in FIG. 11, the transmit power control apparatus 10 provided by this application includes a processing module 11.

The processing module 11 is configured to: when a transmission overlap between uplink carriers of at least two PUCCH groups exists in time domain, obtain minimum reserved power of each PUCCH group based on transmission duration and/or transmission content, where downlink transmission duration is different between the PUCCH groups.

The processing module 11 is further configured to transmit uplink information after reducing power of an uplink carrier of each PUCCH group based on maximum transmit power and minimum reserved power of the uplink carrier of each PUCCH group.

In a specific implementation, if reduced power on an overlapping part of an uplink carrier of a first PUCCH group is lower than minimum reserved power of the first PUCCH group, information on the overlapping part of the uplink carrier of the first PUCCH group is discarded.

In a specific implementation, the processing module 11 is specifically configured to: if uplink transmission duration of all the PUCCH groups is the same, determine the minimum reserved power of each PUCCH group based on downlink transmission duration of the group, where minimum reserved power of a PUCCH group whose downlink transmission duration is short is higher than minimum reserved power of a PUCCH group whose downlink transmission duration is long.

In a specific implementation, minimum reserved power of a PUCCH group whose uplink transmission duration is short is higher than minimum reserved power of a PUCCH group whose uplink transmission duration is long.

In a specific implementation, the processing module 11 is specifically configured to: when transmission content of the at least two PUCCH groups is different, determine the minimum reserved power of each PUCCH group based on priorities of the transmission content, where the transmission content includes a HARQ-ACK, an SR, CSI, and data, and the priorities of the transmission content include: priorities of the HARQ-ACK and/or the SR, the CSI, and the data are in descending order.

The transmit power control apparatus 10 provided by this embodiment is configured to implement the technical solution of the terminal device in the transmit power control method in the foregoing embodiment. The implementation principle and technical effect thereof are similar, and are not described again herein.

Optionally, in Embodiment 2 of the transmit power control apparatus 10, the processing module 11 is configured to: when a transmission overlap between at least two channels exists in time domain, perform power control based on transmission duration or transmission content of the at least two channels, and transmit uplink information, where a transmission priority of a channel whose transmission duration is short is higher than that of a channel whose transmission duration is long, or a priority of a channel carrying uplink control information is higher than that of a channel carrying other content, and the transmission content includes a DMRS.

In a specific implementation, the at least two channels include a first channel and a second channel, and transmission duration of the first channel is shorter than transmission duration of the second channel.

In a specific implementation, a transmission overlapping part of the first channel and a transmission overlapping part of the second channel both use self-contained DMRSs for demodulation, a DMRS of the first channel and a DMRS of the second channel overlap, and transmission content on the transmission overlapping parts of the first channel and the second channel is the same; and in this case, the processing module 11 is specifically configured to: transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion.

In a specific implementation, a transmission overlapping part of the first channel and a transmission overlapping part of the second channel both use self-contained DMRSs for demodulation, a DMRS of the first channel and a DMRS of the second channel overlap, the overlapping part of the first channel is a PUCCH, and the overlapping part of the second channel is a PUSCH or a PUCCH; and in this case, the processing module 11 is specifically configured to: transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion.

In a specific implementation, a transmission overlapping part of the first channel and a transmission overlapping part of the second channel both use self-contained DMRSs for demodulation, a DMRS of the first channel and a DMRS of the second channel overlap, and the overlapping parts of the first channel and the second channel are both PUSCHs; and in this case, the processing module is specifically configured to: if the first channel carries UCI, transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion; or if the second channel carries UCI, transmit uplink information on the second channel, and transmit uplink information after reducing, based on maximum transmit power, power on the overlapping part of the first channel that overlaps the second channel, where if the power on the overlapping part of the first channel after power reduction is insufficient to support DMRS demodulation, transmission of the DMRS and information to be demodulated by using the DMRS on the first channel is abandoned; or transmit information after reducing transmit power of the first channel based on maximum transmit power and a first proportion, and transmit information after reducing transmit power of the second channel based on a second proportion, where the first proportion is greater than the second proportion; or if the first channel and the second channel both carry UCI, transmit uplink information based on priorities of content of the UCI, where the content of the UCI includes a HARQ-ACK, an SR, CSI, and data, and the priorities of the content of the UCI include: priorities of the HARQ-ACK and/or the SR, the CSI, and the data are in descending order.

In a specific implementation, a transmission overlapping part of the first channel uses a shared DMRS for demodulation, a transmission overlapping part of the second channel uses a self-contained DMRS for demodulation, and the DMRS of the first channel does not overlap; and in this case, the processing module 11 is specifically configured to: transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion.

In a specific implementation, a transmission overlapping part of the first channel uses a shared DMRS for demodulation, a transmission overlapping part of the second channel uses a self-contained DMRS for demodulation, the DMRS of the first channel does not overlap, the overlapping part of the first channel is a PUCCH, and the overlapping part of the second channel is a PUSCH or a PUCCH; and in this case, the processing module 11 is specifically configured to: transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion.

In a specific implementation, a transmission overlapping part of the first channel uses a shared DMRS for demodulation, a transmission overlapping part of the second channel uses a self-contained DMRS for demodulation, the DMRS of the first channel does not overlap, and the first channel and the second channel are both PUSCHs; and in this case, the processing module 11 is specifically configured to: if the first channel carries UCI, transmit uplink information on the first channel, and reduce, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion; or if the second channel carries UCI, transmit uplink information on the second channel, and transmit uplink information after reducing, based on maximum transmit power, power on the overlapping part of the first channel that overlaps the second channel; or transmit information after reducing transmit power of the first channel based on maximum transmit power and a first proportion, and transmit information after reducing transmit power of the second channel based on a second proportion, where the first proportion is greater than the second proportion; or if the first channel and the second channel both carry UCI, transmit uplink information based on priorities of content of the UCI, where the content of the UCI includes a HARQ-ACK, an SR, CSI, and data, and the priorities of the content of the UCI include: priorities of the HARQ-ACK and/or the SR, the CSI, and the data are in descending order.

In a specific implementation, an overlapping part of the first channel uses a shared DMRS for demodulation, a transmission overlapping part of the second channel uses a self-contained DMRS for demodulation, the DMRS of the first channel overlaps, and transmission content on the transmission overlapping parts of the first channel and the second channel is the same; and in this case, the processing module 11 is specifically configured to: transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, the DMRS and information to be demodulated by using the DMRS on the second channel are abandoned; or transmit information after reducing transmit power of the first channel based on maximum transmit power and a first proportion, and transmit information after reducing transmit power of the second channel based on a second proportion, where the first proportion is smaller than the second proportion.

In a specific implementation, an overlapping part of the first channel uses a shared DMRS for demodulation, a transmission overlapping part of the second channel uses a self-contained DMRS for demodulation, the DMRS of the first channel overlaps, the overlapping part of the first channel is a PUCCH, and the overlapping part of the second channel is a PUSCH or a PUCCH; and in this case, the processing module 11 is specifically configured to: transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion.

In a specific implementation, an overlapping part of the first channel uses a shared DMRS for demodulation, a transmission overlapping part of the second channel uses a self-contained DMRS for demodulation, the DMRS of the first channel overlaps, and the overlapping parts of the first channel and the second channel are both PUSCHs; and in this case, the processing module 11 is specifically configured to: if the first channel carries UCI, transmit uplink information on the first channel, and transmit uplink information after reducing, based on maximum transmit power, power on the overlapping part of the second channel that overlaps the first channel, where if the power on the overlapping part of the second channel after power reduction is insufficient to support DMRS demodulation, transmission of the DMRS and information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion; or if the second channel carries UCI, transmit an uplink information on the second channel, and transmit uplink information after reducing, based on maximum transmit power, power on the overlapping part of the first channel that overlaps the second channel, where if the power on the overlapping part of the first channel after power reduction is insufficient to support channel demodulation by using the DMRS, transmission of information to be demodulated by using the DMRS on the first channel is abandoned; or transmit information after reducing transmit power of the first channel based on maximum transmit power and a first proportion, and transmit information after reducing transmit power of the second channel based on a second proportion, where the first proportion is greater than the second proportion; or if the first channel and the second channel both carry UCI, transmit uplink information based on priorities of content of the UCI, where the content of the UCI includes a HARQ-ACK, an SR, CSI, and data, and the priorities of the content of the UCI include: priorities of the HARQ-ACK and/or the SR, the CSI, and the data are in descending order.

In a specific implementation, an overlapping part of the first channel uses a self-contained DMRS for demodulation, the second channel uses a shared DMRS for demodulation, and the DMRS of the second channel does not overlap; and in this case, the processing module 11 is specifically configured to: if the DMRS of the second channel is transmitted successfully, transmit uplink information on the second channel, and transmit uplink information after reducing, based on maximum transmit power, power on the overlapping part of the first channel that overlaps the second channel, where if the power on the overlapping part of the first channel after power reduction is insufficient to support channel demodulation by using the DMRS, transmission of the DMRS and information to be demodulated by using the DMRS on the first channel is abandoned; or transmit information after reducing transmit power of the first channel based on maximum transmit power and a first proportion, and transmit information after reducing transmit power of the second channel based on a second proportion, where the first proportion is greater than the second proportion.

In a specific implementation, an overlapping part of the first channel uses a self-contained DMRS for demodulation, an overlapping part of the second channel uses a shared DMRS for demodulation, the DMRS of the second channel does not overlap, and transmission content on the transmission overlapping parts of the first channel and the second channel is the same; and in this case, the processing module is specifically configured to: transmit uplink information on the first channel, and transmit uplink information after reducing, based on maximum transmit power, power on the overlapping part of the second channel that overlaps the first channel; or transmit information after reducing transmit power of the first channel based on maximum transmit power and a first proportion, and transmit information after reducing transmit power of the second channel based on a second proportion, where the first proportion is smaller than the second proportion.

In a specific implementation, an overlapping part of the first channel uses a self-contained DMRS for demodulation, an overlapping part of the second channel uses a shared DMRS for demodulation, the DMRS of the second channel does not overlap, the overlapping part of the first channel is a PUCCH, and the overlapping part of the second channel is a PUSCH or a PUCCH; and in this case, the processing module 11 is specifically configured to: transmit uplink information on the first channel, and transmit uplink information after reducing, based on maximum transmit power, power on the overlapping part of the second channel that overlaps the first channel; or transmit information after reducing transmit power of the first channel based on maximum transmit power and a first proportion, and transmit information after reducing transmit power of the second channel based on a second proportion, where the first proportion is smaller than the second proportion.

In a specific implementation, an overlapping part of the first channel uses a self-contained DMRS for demodulation, an overlapping part of the second channel uses a shared DMRS for demodulation, the DMRS of the second channel does not overlap, and the overlapping parts of the first channel and the second channel are both PUSCHs; and in this case, the processing module 11 is specifically configured to: if the first channel carries UCI, transmit uplink information on the first channel, and transmit uplink information after reducing, based on maximum transmit power, power on the overlapping part of the second channel that overlaps the first channel; or transmit information after reducing transmit power of the first channel based on maximum transmit power and a first proportion, and transmit information after reducing transmit power of the second channel based on a second proportion, where the first proportion is smaller than the second proportion; or if the second channel carries UCI, transmit uplink information on the second channel, and transmit uplink information after reducing, based on maximum transmit power, power on the overlapping part of the first channel that overlaps the second channel, where if the power on the overlapping part of the first channel after power reduction is insufficient to support channel demodulation by using the DMRS, transmission of the DMRS and information to be demodulated by using the DMRS on the first channel is abandoned; or transmit information after reducing transmit power of the first channel based on maximum transmit power and a first proportion, and transmit information after reducing transmit power of the second channel based on a second proportion, where the first proportion is greater than the second proportion; or if the first channel and the second channel both carry UCI, transmit uplink information based on priorities of content of the UCI, where the content of the UCI includes a HARQ-ACK, an SR, CSI, and data, and the priorities of the content of the UCI include: priorities of the HARQ-ACK and/or the SR, the CSI, and the data are in descending order.

In a specific implementation, a transmission overlapping part of the first channel and a transmission overlapping part of the second channel both use shared DMRSs for demodulation, and a DMRS of the first channel does not collide with a DMRS of the second channel; and in this case, the processing module 11 is specifically configured to: transmit uplink information on the first channel, and transmit uplink information after reducing, based on maximum transmit power, power on the overlapping part of the second channel that overlaps the first channel; or transmit information after reducing transmit power of the first channel based on maximum transmit power and a first proportion, and transmit information after reducing transmit power of the second channel based on a second proportion, where the first proportion is smaller than the second proportion; or if the first channel carries UCI, transmit uplink information on the first channel, and transmit uplink information after reducing, based on maximum transmit power, power on the overlapping part of the second channel that overlaps the first channel; or if the second channel carries UCI, transmit uplink information on the second channel, and transmit uplink information after reducing, based on maximum transmit power, power on the overlapping part of the first channel that overlaps the second channel; or if the first channel and the second channel both carry UCI, transmit uplink information based on priorities of content of the UCI, where the content of the UCI includes a HARQ-ACK, an SR, CSI, and data, and the priorities of the content of the UCI include: priorities of the HARQ-ACK and/or the SR, the CSI, and the data are in descending order.

In a specific implementation, a transmission overlapping part of the first channel and a transmission overlapping part of the second channel both use shared DMRSs for demodulation, and a DMRS of the first channel collides with a DMRS of the second channel; and in this case, the processing module 11 is specifically configured to: transmit uplink information on the first channel, and transmit information after reducing power on the DMRS of the second channel based on maximum transmit power, where if the power on the overlapping part of the second channel after power reduction is insufficient to support channel demodulation by using the DMRS, transmission of information to be demodulated by using the DMRS on the second channel is abandoned; or transmit information after reducing transmit power of the first channel based on maximum transmit power and a first proportion, and transmit information after reducing transmit power of the second channel based on a second proportion, where the first proportion is smaller than the second proportion.

The transmit power control apparatus 10 provided by this embodiment is configured to implement the technical solution of the terminal device in the transmit power control method in the foregoing embodiment. The implementation principle and technical effect thereof are similar, and are not described again herein.

Optionally, in Embodiment 3 of the transmit power control apparatus 10, the second channel includes a channel for slot aggregation transmission or uplink control information UCI retransmission; and in this case, the processing module 11 is specifically configured to: transmit uplink information on the first channel, and reduce, based on maximum transmit power, power on an overlapping part of the second channel that overlaps the first channel, where after power reduction, if the power on the overlapping part of the second channel that overlaps the first channel is lower than preset minimum reserved power, information on the overlapping part of the second channel that overlaps the first channel is discarded.

The transmit power control apparatus 10 provided by this embodiment is configured to implement the technical solution of the terminal device in the transmit power control method in the foregoing embodiment. The implementation principle and technical effect thereof are similar, and are not described again herein.

It should be understood that, in an implementation of the transmit power control apparatus, the processing module may be specifically implemented as a processor.

This application further provides a terminal device, including a memory, a processor, and a computer program. The computer program is stored in the memory, and the processor executes the computer program to perform the technical solution of the transmit power control method provided by any one of the foregoing embodiments.

In a specific implementation of the foregoing terminal device, a quantity of processors is at least one, and the processor is configured to execute an executable instruction stored in the memory, that is, a computer program, so that the terminal device performs data interaction with a base station or another network device or terminal device at a receive end by using a communications interface, to perform the technical solution of the transmit power control method provided by any one of the foregoing implementations. Optionally, the memory may be integrated in the processor.

This application further provides a storage medium, including a readable storage medium and a computer program, where the computer program is used to implement the transmit power control method provided by any one of the foregoing embodiments.

This application further provides a program product, where the program product includes a computer program (that is, an execution instruction), and the computer program is stored in a readable storage medium. At least one processor of a terminal device may read the computer program from the readable storage medium, and the at least one processor executes the computer program, so that the terminal device implements the transmit power control method provided by the foregoing implementations.

In the foregoing implementation of the terminal device, it should be understood that the processor may be a central processing unit (CPU), or may be another general-purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly implemented by a hardware processor, or may be implemented by a combination of hardware and a software module in a processor.

All or some of the steps in the foregoing method embodiments may be implemented by a program instructing relevant hardware. The foregoing program may be stored in a readable memory. When the program is executed, the steps of the methods in the embodiments are performed. The memory (storage medium) includes a read-only memory (ROM), a RAM, a flash memory, a hard disk, a solid state disk, a magnetic tape, a floppy disk, an optical disc, and any combination thereof.

What is claimed is:

1. A method, comprising:
when an overlap between at least two channels exists in a time domain, performing power control on the at least two channels based on whether respective transmission contents of channels of the at least two channels comprise uplink control information (UCI); and
transmitting uplink information on the at least two channels according to the performed power control; and
wherein the at least two channels comprise a first channel and a second channel, and performing the power control comprises:
when the first channel comprises UCI and the second channel does not comprises UCI, adjusting transmit power of the first channel and transmit power of the second channel based on a maximum transmit power, a first proportion, and a second proportion, the first proportion smaller than the second proportion.

2. The method according to claim 1,
wherein adjusting the transmit power of the first channel and the transmit power of the second channel comprises:
reducing the transmit power of the first channel based on the maximum transmit power and the first proportion, and reducing the transmit power of the second channel based on the second proportion.

3. The method according to claim 2, wherein an overlapping part of the first channel and an overlapping part of the second channel both use a respective self-contained demodulation reference signal (DMRS) for demodulation, a DMRS of the first channel and a DMRS of the second channel overlap, the overlapping part of the first channel is a first physical uplink shared channel (PUSCH), and the overlapping part of second channel is a second PUSCH.

4. The method according to claim 2, wherein an overlapping part of the first channel uses a shared demodulation reference signal (DMRS) for demodulation, an overlapping part of the second channel uses a self-contained DMRS for demodulation, a DMRS of the first channel does not overlap with the second channel, the first channel is a first physical uplink shared channel (PUSCH), and the second channel is a second PUSCH.

5. The method according to claim 1,
wherein adjusting the transmit power of the first channel and the transmit power of the second channel comprises:
reducing transmit power of an overlapping part of the second channel based on the maximum transmit power.

6. The method according to claim 5, wherein an overlapping part of the first channel and the overlapping part of the second channel both use a respective self-contained demodulation reference signal (DMRS) for demodulation, a DMRS of the first channel and a DMRS of the second channel overlap, the overlapping part of the first channel is a first physical uplink shared channel (PUSCH), and the overlapping part of second channel is a second PUSCH.

7. The method according to claim 5, wherein an overlapping part of the first channel uses a shared demodulation reference signal (DMRS) for demodulation, the overlapping part of the second channel uses a self-contained DMRS for demodulation, a DMRS of the first channel does not overlap with the second channel, the first channel is a first physical uplink shared channel (PUSCH), and the second channel is a second PUSCH.

8. The method according to claim 1, wherein performing the power control comprises:
performing the power control based on respective transmission priorities of the at least two channels and based on whether the respective transmission contents of the channels of the at least two channels comprise UCI, wherein a transmission priority of a channel whose transmission duration is shorter is higher than that of a channel whose transmission duration is longer.

9. An apparatus, comprising:
a non-transitory storage medium including executable instructions; and
a processor; and
wherein the executable instructions, when executed by the processor, cause the apparatus to:
when an overlap between at least two channels exists in a time domain, perform power control on the at least two channels based on whether respective transmission contents of channels of the at least two channels comprise uplink control information (UCI), and transmit uplink information on the at least two channels according to the performed power control; and
wherein the at least two channels comprise a first channel and a second channel, and performing the power control comprises:
when the first channel comprises UCI and the second channel does not comprises UCI, adjusting transmit power of the first channel and transmit power of the second channel based on a maximum transmit power, a first proportion, and a second proportion, the first proportion smaller than the second proportion.

10. The apparatus according to claim 9,
wherein adjusting the transmit power of the first channel and the transmit power of the second channel comprises:
reducing the transmit power of the first channel based on the maximum transmit power and the first proportion, and reducing the transmit power of the second channel based on the second proportion.

11. The apparatus according to claim 10, wherein an overlapping part of the first channel and an overlapping part of the second channel both use a respective self-contained demodulation reference signal (DMRS) for demodulation, a DMRS of the first channel and a DMRS of the second channel overlap, the overlapping part of the first channel is a first physical uplink shared channel (PUSCH), and the overlapping part of second channel is a second PUSCH.

12. The apparatus according to claim 10, wherein an overlapping part of the first channel uses a shared demodulation reference signal (DMRS) for demodulation, an overlapping part of the second channel uses a self-contained DMRS for demodulation, a DMRS of the first channel does not overlap with the second channel, the first channel is a first physical uplink shared channel (PUSCH), and the second channel is a second PUSCH.

13. The apparatus according to claim 9,
wherein the executable instructions, when executed by the processor, cause the apparatus to:
reduce transmit power of an overlapping part of the second channel based on the maximum transmit power.

14. The apparatus according to claim 13, wherein an overlapping part of the first channel and the overlapping part of the second channel both use a respective self-contained demodulation reference signal (DMRS) for demodulation, a DMRS of the first channel and a DMRS of the second channel overlap, the overlapping part of the first channel is a first physical uplink shared channel (PUSCH), and the overlapping part of second channel is a second PUSCH.

15. The apparatus according to claim 13, wherein an overlapping part of the first channel uses a shared demodulation reference signal (DMRS) for demodulation, the overlapping part of the second channel uses a self-contained DMRS for demodulation, a DMRS of the first channel does not overlap with the second channel, the first channel is a first physical uplink shared channel (PUSCH), and the second channel is a second PUSCH.

16. The apparatus according to claim 9, wherein performing the power control comprises:
performing the power control based on respective transmission priorities of the at least two channels and based on whether the respective transmission contents of the channels of the at least two channels comprise UCI, wherein a transmission priority of a channel whose transmission duration is shorter is higher than that of a channel whose transmission duration is longer.

17. A non-transitory computer-readable storage medium, comprising executable instructions, wherein the executable instructions, when executed by a computer, cause the computer to:

when an overlap between at least two channels exists in a time domain, perform power control on the at least two channels based on whether respective transmission contents of channels of the at least two channels comprise uplink control information (UCI), and transmit uplink information on the at least two channels according to the performed power control; and wherein the at least two channels comprise a first channel and a second channel, and performing the power control comprises:

when the first channel comprises UCI and the second channel does not comprises UCI, adjusting transmit power of the first channel and transmit power of the second channel based on a maximum transmit power, a first proportion, and a second proportion, the first proportion smaller than the second proportion.

18. The non-transitory computer-readable storage medium according to claim 17, wherein adjusting the transmit power of the first channel and the transmit power of the second channel comprises:

reducing the transmit power of the first channel based on the maximum transmit power and the first proportion, and reducing the transmit power of the second channel based on the second proportion, wherein the first proportion is smaller than the second proportion.

19. The non-transitory computer-readable storage medium according to claim 17, wherein the executable instructions, when executed by the computer, cause the computer to:

reduce transmit power of an overlapping part of the second channel based on the maximum transmit power.

20. The non-transitory computer-readable storage medium according to claim 17, wherein performing the power control comprises:

performing the power control based on respective transmission priorities of the at least two channels and based on whether the respective transmission contents of the channels of the at least two channels comprise UCI, wherein a transmission priority of a channel whose transmission duration is shorter is higher than that of a channel whose transmission duration is longer.

* * * * *